United States Patent
Rieger et al.

(10) Patent No.: US 8,365,625 B2
(45) Date of Patent: Feb. 5, 2013

(54) DOUBLE CLUTCH TRANSMISSION

(75) Inventors: Wolfgang Rieger, Friedrichshafen (DE); Philip Recker, Friedrichshafen (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 428 days.

(21) Appl. No.: 12/758,897

(22) Filed: Apr. 13, 2010

(65) Prior Publication Data

US 2010/0257956 A1 Oct. 14, 2010

(30) Foreign Application Priority Data

Apr. 14, 2009 (DE) .................. 10 2009 002 343

(51) Int. Cl.
*F16H 3/08* (2006.01)
(52) U.S. Cl. .......................................... 74/330
(58) Field of Classification Search ............ 74/330, 74/333, 340
See application file for complete search history.

(56) References Cited

U.S. PATENT DOCUMENTS

| | | | | |
|---|---|---|---|---|
| 6,869,379 B2 * | 3/2005 | Voss et al. | | 475/218 |
| 7,066,043 B2 * | 6/2006 | Kim et al. | | 74/330 |
| 7,225,696 B2 * | 6/2007 | Gitt | | 74/340 |
| 7,597,644 B2 * | 10/2009 | Rodgers, II | | 475/218 |
| 7,604,561 B2 * | 10/2009 | Earhart | | 475/218 |
| 7,604,565 B2 * | 10/2009 | Lee et al. | | 477/3 |
| 8,051,732 B2 * | 11/2011 | Gitt | | 74/331 |
| 2005/0000307 A1 | 1/2005 | Gumpoltsberger | | |
| 2009/0036247 A1 * | 2/2009 | Earhart et al. | | 475/35 |

FOREIGN PATENT DOCUMENTS

| | | |
|---|---|---|
| DE | 38 22 330 A1 | 7/1989 |
| DE | 100 15 336 A1 | 10/2001 |
| DE | 103 05 241 A1 | 9/2004 |
| DE | 10 2004 001 961 A1 | 8/2005 |
| DE | 10 2005 028 532 A1 | 12/2006 |
| DE | 10 2007 049 257 A1 | 4/2009 |
| DE | 10 2007 049 259 A1 | 4/2009 |
| DE | 10 2007 049 260 A1 | 4/2009 |
| DE | 10 2007 049 263 A1 | 4/2009 |
| DE | 10 2007 049 264 A1 | 4/2009 |
| DE | 10 2007 049 265 A1 | 4/2009 |
| DE | 10 2007 049 266 A1 | 4/2009 |
| DE | 10 2007 049 267 A1 | 4/2009 |
| DE | 10 2007 049 269 A1 | 4/2009 |
| DE | 10 2007 049 270 A1 | 4/2009 |

* cited by examiner

*Primary Examiner* — Ha D. Ho
(74) *Attorney, Agent, or Firm* — Davis & Bujold, PLLC

(57) ABSTRACT

A double clutch transmission comprising two clutches each having an input side connected to a drive shaft and an output side connected to one of two transmission input shafts coaxially arranged with respect to one another. At least two countershafts, on which toothed idler gearwheels are pivotally supported and toothed fixed gearwheels are disposed on both transmission input shafts in a rotationally fixed manner and mesh with at least some of the idler gearwheels. A plurality of coupling devices connect an idler gearwheel to a countershaft in a rotationally fixed manner. One output gear is provided on both countershafts which is coupled to gearing of an output shaft. At least one first shift element connects two toothed gearwheels in a rotationally fixed manner such that a plurality of power shifting forward gears and at least one reverse gear can be shifted.

26 Claims, 20 Drawing Sheets

| G | ZS | K1 | K2 | B | C | D | E | H | I | J | K | L | M |
|---|---|---|---|---|---|---|---|---|---|---|---|---|---|
| G1 | $i\_3 \cdot i\_4 \cdot i\_2$ | 1 | | | | | | | 1 | | | | 1 |
| G2 | $i\_2$ | | 1 | | | | | | 1 | | | | |
| G3 | $i\_3$ | 1 | | | | 1 | | | | | | | |
| G4 | $i\_4$ | | 1 | | 1 | | | | | | | | |
| G5 | $i\_5$ | 1 | | | | | 1 | | | | | | |
| G6 | $i\_6$ | | 1 | | | | | 1 | | | | | |
| G7 | $i\_7$ | 1 | | 1 | | | | | | | | | |
| G8 | $i\_8$ | | 1 | | | | | | | | 1 | | |
| G9 | $i\_9$ | 1 | | | | | | | | | | 1 | |

R-GEAR

| R1 | $i\_R$ | 1 | | | | | | | | 1 | | | |

OVERDRIVE

| O1 | $i\_4 \cdot i\_3 \cdot i\_9$ | | 1 | | | | | | | | | 1 | 1 | lsb.

Fig. 2

| G | ZS | K1 | K2 | A | C | D | E | G | H | I | J | K | M | N |
|---|---|---|---|---|---|---|---|---|---|---|---|---|---|---|
| G1 | i_5·i_8·i_2 | 1 |  |  |  |  |  | 1 |  |  |  |  | 1 |  |
| G2 | i_2 | 1 | 1 |  |  |  |  | 1 |  |  |  |  |  |  |
| G3 | i_3 | 1 |  |  |  |  |  |  | 1 |  |  |  |  |  |
| G4 | i_4 | 1 | 1 |  |  |  |  |  | 1 |  |  |  |  |  |
| G5 | i_5 | 1 |  |  |  | 1 |  |  |  |  |  |  |  |  |
| G6 | i_6 | 1 | 1 |  |  | 1 |  |  |  |  |  |  |  |  |
| G7 | i_7 | 1 |  |  |  |  | 1 |  |  |  |  |  |  |  |
| G8 | i_8 | 1 | 1 |  | 1 |  |  |  |  |  |  |  |  |  |
| G9 | i_9 | 1 |  |  |  |  |  |  |  |  |  | 1 |  |  |

R-GEAR

| | | K1 | K2 | A | C | D | E | G | H | I | J | K | M | N |
|---|---|---|---|---|---|---|---|---|---|---|---|---|---|---|
| R1 | i_3·i_6·i_R | 1 |  | 1 |  |  |  |  |  |  |  |  |  | 1 |

CRAWLER

| | | K1 | K2 | A | C | D | E | G | H | I | J | K | M | N |
|---|---|---|---|---|---|---|---|---|---|---|---|---|---|---|
| C1 | i_3·i_6·i_2 | 1 |  |  |  |  |  | 1 |  |  |  |  |  | 1 |

OVERDRIVE

| | | K1 | K2 | A | C | D | E | G | H | I | J | K | M | N |
|---|---|---|---|---|---|---|---|---|---|---|---|---|---|---|
| O1 | i_8·i_5·i_9 |  | 1 |  |  |  | 1 |  |  |  |  |  | 1 |  |
| O2 | i_8·i_5·i_7 |  | 1 |  |  |  | 1 |  |  |  |  |  | 1 |  |
| O3 | i_6·i_3·i_9 |  | 1 |  |  | 1 |  |  |  |  |  |  |  | 1 |
| O4 | i_6·i_3·i_5 |  | 1 |  |  |  |  |  |  |  |  | 1 |  | 1 |
| O5 | i_6·i_3·i_7 |  | 1 |  |  |  |  |  |  |  |  | 1 |  | 1 |

| G | ZS | K1 | K2 | B | C | D | E | F | H | I | K | L | M |
|---|---|---|---|---|---|---|---|---|---|---|---|---|---|
| G1 | i_1 | 1 | | | | | 1 | | | | | | |
| G2 | i_2 | | 1 | 1 | | | | | | | | | |
| G3 | i_3 | 1 | | | | | | | | | | | |
| G4 | i_4 | | 1 | | | | | | 1 | | | | |
| G5 | i_5 | 1 | | | | | | | | | | | |
| G6 | i_6 | | 1 | | 1 | | | | | | | | |
| G7 | i_7 | 1 | | | | 1 | | | | | | | |
| G8 | i_8 | | 1 | | | | | | | 1 | | | |
| G9 | i_7·i_6·i_8 | 1 | | | | | | | | | | | 1 |

R- GEAR

| | | | | | | | | | | | | | |
|---|---|---|---|---|---|---|---|---|---|---|---|---|---|
| R1 | i_6·i_7·i_R | | 1 | | | | | 1 | | | | | 1 |

Fig. 8

| G | ZS | K1 | K2 | B | C | D | E | G | H | I | J | K | M | N |
|---|---|---|---|---|---|---|---|---|---|---|---|---|---|---|
| G1 | i_1 | 1 | | | | | | | | | | | | |
| G2 | i_2 | | 1 | | | | 1 | | | | | | | |
| G3 | i_3 | 1 | | | 1 | | | | | | | | | |
| G4 | i_4 | | 1 | | | 1 | | | | | | | | |
| G5 | i_5 | 1 | | | | | | | 1 | | | | | |
| G6 | i_6 | | 1 | | | | | | | 1 | | | | |
| G7 | i_7 | 1 | | | | | | | | | 1 | | | |
| G8 | i_8 | | 1 | | | | | 1 | | | | | | |
| G9 | i_7·i_6·i_8 | 1 | | | | | | 1 | | | | | | 1 |

R-GEAR

| | | K1 | K2 | B | | | | | | | | | | | |
|---|---|---|---|---|---|---|---|---|---|---|---|---|---|---|---|
| R1 | i_R | | 1 | 1 | | | | | | | | | | | |
| R2 | i_7·i_6·i_R | 1 | | 1 | | | | | | | | | | | |

CRAWLER

| | | K1 | | | | | E | | | | | | | | N |
|---|---|---|---|---|---|---|---|---|---|---|---|---|---|---|---|
| C1 | i_6·i_7·i_1 | 1 | | | | | 1 | | | | | | | | 1 | lsb.

OVERDRIVE

| | | K1 | | | | | | G | | | | | M | |
|---|---|---|---|---|---|---|---|---|---|---|---|---|---|---|
| O1 | i_5·i_4·i_8 | 1 | | | | | | 1 | | | | | 1 | |

| G | ZS | K1 | K2 | B | C | E | H | I | J | K | L | M | N |
|---|---|---|---|---|---|---|---|---|---|---|---|---|---|
| G1 | i_1 | 1 |   |   |   |   |   |   |   |   | 1 |   |   |
| G2 | i_2 |   | 1 | 1 |   |   |   |   |   |   |   |   |   |
| G3 | i_3 | 1 |   |   |   |   |   |   |   | 1 |   |   |   |
| G4 | i_4 |   | 1 | 1 |   |   |   |   |   |   |   |   |   |
| G5 | i_5 | 1 |   |   |   | 1 |   |   |   |   |   |   |   |
| G6 | i_6 |   | 1 |   |   |   |   |   |   |   |   |   |   |
| G7 | i_7 | 1 |   |   |   |   |   |   |   |   |   |   |   |
| G8 | i_8 |   | 1 |   | 1 |   |   |   |   |   |   |   |   |
| G9 | i_7·i_6·i_8 |   |   |   | 1 |   |   |   | 1 |   |   |   | 1 |

R- GEAR

| R1 | i_8·iR·i_1 |   | 1 |   |   |   |   |   |   |   | 1 | 1 |   | lsb. |

CRAWLER

| C1 | i_6·i_7·i_1 |   | 1 |   |   |   |   |   |   |   | 1 |   | 1 | lsb. |

Fig. 10

| G | ZS | K1 | K2 | A | B | C | D | E | H | I | J | K | M | N |
|---|---|---|---|---|---|---|---|---|---|---|---|---|---|---|
| G1 | i_1 | 1 |   |   |   |   |   | 1 |   |   |   |   |   |   |
| G2 | i_2 |   | 1 |   | 1 |   |   |   |   |   |   |   |   |   |
| G3 | i_3 | 1 |   |   |   |   |   |   |   |   |   | 1 |   |   |
| G4 | i_4 |   | 1 |   |   | 1 |   |   |   |   |   |   |   |   |
| G5 | i_5 |   |   |   |   |   | 1 |   |   |   |   |   |   |   |
| G6 | i_6 |   | 1 |   |   |   |   |   | 1 |   |   |   |   |   |
| G7 | i_7 | 1 |   |   |   |   |   |   |   |   | 1 |   |   |   |
| G8 | i_8 |   | 1 | 1 |   |   |   |   |   | 1 |   |   |   |   |
| G9 | i_7·i_6·i_8 | 1 |   | 1 |   |   |   |   |   |   |   |   |   | 1 |

R-GEAR

| | | K1 | K2 | A | B | C | D | E | H | I | J | K | M | N |
|---|---|---|---|---|---|---|---|---|---|---|---|---|---|---|
| R1 | i_R |   | 1 |   | 1 |   |   |   |   |   |   |   |   |   |
| R2 | i_7·i_6·i_R | 1 |   |   | 1 |   |   |   |   |   |   |   |   | 1 |

CRAWLER

| | | K1 | K2 | A | B | C | D | E | H | I | J | K | M | N | |
|---|---|---|---|---|---|---|---|---|---|---|---|---|---|---|---|
| C1 | i_4·i_5·i_1 |   | 1 |   |   |   |   | 1 |   |   |   |   | 1 |   | 1sb. |
| C2 | i_6·i_7·i_1 | 1 |   |   |   |   |   | 1 |   |   |   |   |   | 1 | 1sb. |

| G | ZS | K1 | K2 | A | B | D | E | G | H | I | J | K | M | N |
|---|---|---|---|---|---|---|---|---|---|---|---|---|---|---|
| G1 | i_1 | 1 |   |   | 1 |   |   |   |   |   |   |   |   |   |
| G2 | i_2 | 1 | 1 |   |   |   |   |   |   |   |   |   |   |   |
| G3 | i_3 |   | 1 |   |   | 1 |   |   |   |   |   |   |   |   |
| G4 | i_4 | 1 | 1 |   |   |   |   |   |   |   |   |   |   |   |
| G5 | i_5 |   | 1 |   |   |   |   |   |   |   | 1 |   |   |   |
| G6 | i_6 | 1 | 1 |   |   |   |   |   |   |   |   |   |   |   |
| G7 | i_7 |   | 1 |   |   |   | 1 |   |   |   |   |   |   |   |
| G8 | i_8 | 1 | 1 |   |   |   |   |   |   |   |   |   |   |   |
| G9 | i_3_ZW_9_i_8 |   |   | 1 |   |   |   |   |   |   |   |   | 1 |   |

R-GEAR

| | ZS | K1 | K2 | A | B | D | E | G | H | I | J | K | M | N |
|---|---|---|---|---|---|---|---|---|---|---|---|---|---|---|
| R1 | i_3_ZW_9_i_R | 1 |   |   |   |   |   |   |   | 1 |   |   | 1 |   |
| R2 | i_1_i_R_i_2 | 1 |   | 1 |   |   |   |   | 1 |   |   |   |   | 1 |

| G | ZS | K1 | K2 | A | B | C | D | E | G | H | I | J | K | M | N |
|---|---|---|---|---|---|---|---|---|---|---|---|---|---|---|---|
| G1 | i_1 | 1 | | | | | | | | | | 1 | | | |
| G2 | i_2 | | 1 | | 1 | | | | | | | | | | |
| G3 | i_3 | 1 | | | | | 1 | | | | | | | | |
| G4 | i_4 | | 1 | | 1 | | | | | 1 | | | | | |
| G5 | i_5 | 1 | | | | | | | | | | | | 1 | |
| G6 | i_6 | | 1 | | | | | | 1 | | | | | | |
| G7 | i_7 | 1 | | | | | | 1 | | | | | | | |
| G8 | i_8 | | 1 | 1 | | | | | | | | | | | |
| G9 | i_1 ZW_9 i_8 | 1 | | 1 | | | | | | | | | | | 1 |

R- GEAR

| | | K1 | K2 | A | B | C | D | E | G | H | I | J | K | M | N |
|---|---|---|---|---|---|---|---|---|---|---|---|---|---|---|---|
| R1 | i_R | | 1 | | | 1 | | | | | | 1 | | | |
| R2 | i_R i_3 i_1 | | 1 | | | 1 | | | | | | | | 1 | |
| R3 | i_3 i_R ZW_9 | 1 | | | | | | | | | 1 | | | 1 | |
| R4 | i_1 ZW_9 i_R | 1 | | | | | | | | | | | | | 1 | lsb.

Fig. 16

| G | ZS | K1 | K2 | B | C | E | F | H | I | J | K | L | M | N |
|---|---|---|---|---|---|---|---|---|---|---|---|---|---|---|
| G1 | i_1 | 1 | | | | | | | | | | 1 | | |
| G2 | i_2 | | 1 | | | | | | 1 | | | | | |
| G3 | i_3 | 1 | | | | | 1 | | | | | | | |
| G4 | i_4 | | 1 | | 1 | | | | | | | | | |
| G5 | i_5 | 1 | | | | | | | | | 1 | | | |
| G6 | i_6 | | 1 | | | | | 1 | | | | | | |
| G7 | i_7 | 1 | | | | 1 | | | | | | | | |
| G8 | i_8 | | 1 | 1 | | | | | | | | | | |
| G9 | ZW_9_i_4_i_8 | | | 1 | | | | | | | | | 1 | |

R- GEAR

| | | | | | | | | | | | | | | | 1sb. |
|---|---|---|---|---|---|---|---|---|---|---|---|---|---|---|---|
| R1 | i_4_ZW_9_i_R | 1 | | | | | | | | 1 | | | 1 | 1 |
| R2 | i_2_i_R_1 | | 1 | | | | | | | | | | | |

CRAWLER

| | | | | | | | | | | | | | | | 1sb. |
|---|---|---|---|---|---|---|---|---|---|---|---|---|---|---|---|
| C1 | i_4_ZW_9_i_1 | | 1 | | | | | | | | | 1 | 1 | |

| G | ZS | K1 | K2 | B | C | D | E | F | H | I | K | L | M | N |
|---|---|---|---|---|---|---|---|---|---|---|---|---|---|---|
| G1 | i_1 | 1 |  |  |  |  |  |  |  |  | 1 |  |  |  |
| G2 | i_2 | 1 | 1 |  |  |  |  |  |  | 1 |  |  |  |  |
| G3 | i_3 | 1 | 1 |  |  |  | 1 |  |  |  |  |  |  |  |
| G4 | i_4 |  | 1 | 1 |  |  |  |  |  |  |  |  |  |  |
| G5 | i_5 | 1 | 1 |  |  | 1 |  |  |  |  |  |  |  |  |
| G6 | i_6 |  | 1 |  |  |  |  |  | 1 |  |  |  |  |  |
| G7 | i_7 | 1 |  |  |  |  |  | 1 |  |  |  |  |  |  |
| G8 | i_8 |  | 1 | 1 |  |  |  |  |  |  |  |  |  |  |
| G9 | ZW_9_i_2_i_8 | 1 |  |  |  |  |  |  |  |  |  |  |  | 1 |

R- GEAR

| | | K1 | K2 | B | C | D | E | F | H | I | K | L | M | N |
|---|---|---|---|---|---|---|---|---|---|---|---|---|---|---|
| R1 | i_R | 1 |  |  |  |  |  |  |  |  |  | 1 |  |  |
| R2 | i_4_i_5_i_R |  | 1 |  |  |  |  |  |  |  |  | 1 | 1 |  |
| R3 | i_2_ZW_9_i_R |  | 1 |  |  |  |  |  |  |  |  | 1 |  | 1 |

CRAWLER

| | | K1 | K2 | B | C | D | E | F | H | I | K | L | M | N |
|---|---|---|---|---|---|---|---|---|---|---|---|---|---|---|
| C1 | i_4_i_5_i_1 |  | 1 |  |  |  |  |  |  |  | 1 |  | 1 | 1 lsb. |
| C2 | i_2_ZW_9_i_1 |  | 1 |  |  |  |  |  |  |  | 1 |  |  | 1 lsb. |

OVERDRIVE

| | | K1 | K2 | B | C | D | E | F | H | I | K | L | M | N |
|---|---|---|---|---|---|---|---|---|---|---|---|---|---|---|
| O1 | i_5_i_4_i_8 | 1 |  | 1 |  |  |  |  |  |  |  |  | 1 |  |

DOUBLE CLUTCH TRANSMISSION

This application claims priority from German patent application serial no. 10 2009 002 343.7 filed Apr. 14, 2009.

FIELD OF THE INVENTION

The present invention relates to a double clutch transmission.

BACKGROUND OF THE INVENTION

A six or seven gear double clutch transmission is known from the printed publication DE 103 05 241 A1. The double clutch transmission comprises two clutches, which are each connected to the driveshaft at the input sides thereof, and to one of the two transmission input shafts at the respective output sides thereof. The two transmission input shafts are arranged coaxially to each other. Further, two countershafts are arranged axially parallel to the two transmission input shafts, the idler gears of which are combing together with the fixed gears of the transmission input shafts. Furthermore, coupling devices are connected in an axially displaceable, rotationally fixed manner on the countershafts in order to be able to shift the respective toothed gearwheels. The respectively selected transmission ratio is transferred to a differential via the output gears. In order to realize the desired transmission ratio steps in the known double clutch transmission a plurality of gear planes such that a significant amount of construction space is required during installation.

Furthermore, a spur gear multi-speed transmission is known from the printed publication DE 38 22 330 A1. The spur gear multi-speed transmission comprises a double clutch that can be switched under load, one part of which is connected to a driveshaft, and another part of which is connected to a hollow driveshaft that is rotationally supported on the driveshaft. For certain transmission ratios the driveshaft may be coupled to the hollow driveshaft via a shift element.

A power-shift transmission having two clutches is known from the printed publication DE 10 2004 001 961 A1, which are each associated with a subtransmission. The transmission input shafts of both subtransmissions are arranged coaxially to each other and engage idler gears of the associated countershafts with fixed gears. The respective idler gears of the countershafts may be connected to the respective countershaft by means of associated shift elements in a rotationally fixed manner. An eight-shift transmission is known from the printed publication, wherein a further shift element is provided for coupling the two transmission input shafts in order to realize a further transmission ratio step. The eight-shift transmission in this embodiment requires at least six gear planes in both subtransmissions in order to realize the transmission ratio steps. This leads to an undesired elongation of the construction length in the axial direction such that the possibility of installation into a vehicle is substantially limited.

A further power-shift transmission is also known from the printed publication DE 10 2005 028 532 A1, which comprises two input shafts and only one countershaft. This nine-shift transmission requires at least seven gear planes in order to realize the transmission ratio steps. This leads to undesired elongation of the construction length in axial direction. Furthermore, an additional shaft having a gear plane is required in order to realize the reverse transmission ratios, which comprises a shift element and two toothed gears. A further disadvantage arises in the known power-shift transmission in that power shifts are possible only between the first and the second gears.

SUMMARY OF THE INVENTION

The present invention is therefore based on the object of providing a double clutch transmission of the type described above, wherein a plurality of power shift translation ratio steps can be realized in a manner that is as cost effective as possible, with as few components as possible, and at a small required construction space.

Accordingly, a double clutch transmission optimized in terms of construction size is provided, comprising two clutches, the input sides of which are connected to a driveshaft and the output sides of which are connected respectively to one of two transmission input shafts that are disposed, for example, coaxially to each other. The double clutch transmission comprises at least two countershafts or the like, on which toothed gearwheels embodied as idler gears are rotationally supported, wherein toothed gearwheels embodied as fixed gears and connected to the transmission input shafts in a rotationally fixed manner are provided, which engage with at least some of the idler gears. Furthermore, a plurality of coupling devices is provided for connecting an idler gear to the countershaft in a rotationally fixed manner. The double clutch transmission according to the invention comprises an output gear, or a constant pinion, respectively, provided on each of the countershafts, which couples a gearing of a driveshaft in order to connect the respective countershaft to the drive, and at least one actuatable, or engageable shift element or the like as a so-called winding path gear shift element for connecting the of two toothed gearwheels in a rotationally fixed manner, wherein a plurality of power-shifting forward gears and at least one power-shifting reverse gear may be shifted.

According to the invention the double clutch transmission provided preferably comprises only five gear planes, by means of which at least nine power shifting forward gears are realized at a small required construction space.

For example, at least four dual gear planes may be provided, and one idler gear of the first and the second countershafts may be associated with one fixed gear of one of the transmission input shafts in each dual gear plane, at least one idler gear may be utilized for at least two gears in each dual gear plane such that at least one power shifting winding path gear may be shifted via at least one shift element. Due to the possible multiple uses of idler gears, a maximum number of transmission ratios may be realized in the double clutch transmission with as few gear planes as possible, wherein preferably all forward gears and reverse gears may be power shifted in sequential order.

In order to optimize the gradation in the double clutch transmission provided according to the invention, a further dual gear plane may also be replaced with two single gear planes, in that a fixed gear is replaced with two fixed gears. In this manner a particularly harmonic, progressive gear graduation may be achieved.

The double clutch transmission may preferably be embodied as a 9-gear transmission having at least nine power shifted gear steps. Due to the shortened construction as opposed to known transmission arrangements, the double clutch transmission is particularly suited for a front lateral construction in a vehicle. However, other types of constructions are also possible depending on the type and construction space situation of the vehicle in question.

Preferably the first forward gear and/or the highest power-shifting forward gear in the double clutch transmission provided may be a winding path gear. Furthermore, at least one reverse gear may also be embodied as a winding path gear. For example, five shifting idler gears may be associated with the first countershaft, and four or five shifting idler gears may be associated with the second countershaft, wherein each mesh with fixed gears of the associated transmission input shaft.

If the last or next to last gear step is configured to be higher than the respective gear positioned before the same, a particularly high output torque or drive power may be provided in case of a reverse shifting required by the driver.

Within the course of a possible variant embodiment the invention may provide that the double clutch transmission also comprises dual gear planes. It is also conceivable that, for example, only four dual gear planes and, for example, one singe gear plane are provided. Other constellations are also possible.

The invention may provide that an idler gear of the second subtransmission may be connected to an idler gear of the first subtransmission via a first shift element of the first countershaft, wherein at least the first forward gear and at least one overdrive gear may be shifted as winding path gears via the first shift element.

According to a further improvement of the invention it is also possible that the ninth forward gear and one reverse gear may be shifted as a winding path gear via the shift element of the first countershaft.

It may further be provided that an idler gear of the second subtransmission can be connected to an idler gear of the first subtransmission via an alternative or additional shift element on the second countershaft such that the ninth forward gear and one reverse gear and/or a crawler gear may be shifted as the winding path gear via the shift element.

Therefore, winding path gears may be realized via at least one shift element of the double clutch transmission according to the invention, wherein toothed gear wheels of both subtransmissions are coupled to each other in order to thereby realize a flow of power through both subtransmissions. For this purpose the respectively utilized shift element serves for coupling two idler gears, thus bringing the transmission input shafts to be dependent upon one another.

In the double clutch transmission the arrangement of the shift elements may be varied for coupling two certain idler gears such that the shift elements do not necessarily need to be disposed between the idler gears to be coupled. Accordingly, other arrangement positions of the respective shift element are also conceivable in order to optimize a connection to an actuator system.

According to a possible embodiment it may be provided in the double clutch transmission that the first gear plane, being a dual gear plane, and that the second gear plane, also being a dual gear plane, comprise two fixed gears on the second transmission input shaft of the second subtransmission, wherein the third gear plane, being a dual gear plane or being a single gear plane, the fourth gear plane, being a dual gear plane, and the fifth gear plane, being a dual gear plane or being a single gear plane, comprise three idler gears on the first transmission input shaft of the first subtransmission.

Within the scope of a further variant embodiment of the invention it may also be provided that in the double clutch transmission the first gear plane, being a dual gear plane or a single gear plane, the second gear plane being a dual gear plane or being a single gear plane, and the third gear plane, being a dual gear plane, comprise three fixed gears on the second transmission input shaft of the second subtransmission, wherein the fourth gear plane, being a dual gear plane, and the fifth gear plane, being a dual gear plane may comprise two fixed gears of the first transmission input shaft of the first subtransmission.

In order to provide the required reversal of rotation for reverse gears in the double clutch transmission according to the invention at least one intermediate gear or the like may be utilized, which is disposed on an intermediate shaft. It is also possible that one of the idler gears of a countershaft serves as the intermediate gear for at least one reverse gear. In that case no additional intermediate shaft is necessary for the reverse gear transmission, since one of the idler gears meshes both with a fixed gear and an additional shifting idler gear of the other countershaft. In this manner the intermediate gear required for the reverse gear is disposed on a countershaft as a shifting idler gear and further serves for realizing at least one additional forward gear. The intermediate gear may also be embodied as a stepped gear, regardless of whether the same is disposed on the countershaft or on an additional intermediate shaft. It is also possible that the intermediate gear is not disposed on one of the already existing countershafts, but for example, on a further separate shaft, such as a third countershaft.

In order to obtain the desired transmission ratio step it may be provided in the double clutch transmission according to the invention that at least one bidirectionally operative coupling device or the like is disposed on each countershaft. The provided coupling devices may each connect an associated idler gear to the countershaft in a rotationally fixed manner in the activated or engaged state, depending on the actuating direction. Furthermore, a unidirectionally operative coupling device or the like may also be disposed on at least one of the countershafts. As the coupling devices, for example, hydraulically, electrically, pneumatically, mechanically actuated clutches or also positive-locking jaw clutches, as well as any type of synchronization devices may be utilized, which serve to connect an idler gear to a countershaft in a rotationally fixed manner. It is possible that a bidirectionally operative coupling device is replaced with two unidirectionally operative coupling devices, or vice versa.

It is conceivable that the arrangement possibilities of the toothed gearwheels states may be varied, and the number of toothed gearwheels and the number of coupling devices may be changed to realize even further power-shift or non-power-shift gears as well as construction and component savings in the double clutch transmission provided. In particular, fixed gears of dual gear planes may be divided into two fixed gears for two single gear planes. Any step changes may be improved in this manner. It is further also possible to exchange the countershafts. The subtransmissions may also be exchanged, i.e. the same are mirrored about a vertical axis. For this purpose the hollow and solid shafts are exchanged. In this manner it is possible, for example, arrange the smallest toothed gear on the solid shaft to further optimize utilization of the existing construction space. Furthermore, adjacent gear planes may also be exchanged to optimize shaft deflection and/or to optimally connect a shift actuating system. Furthermore, the respective arrangement positions of the coupling devices to the gear plane may be varied. The actuation directions of the coupling devices may further also be changed.

The gear numerations were defined freely. It is also possible to add a crawler, or crawler gear and/or an overdrive or overdrive gear to improve the terrain properties or the acceleration behavior of a vehicle. Furthermore, a first gear may be omitted to better optimize the totality of the step changes. The gear numeration varies accordingly with these measures.

Regardless of the respective variant embodiments of the double clutch transmission the driveshaft and the output shaft may preferably not be disposed coaxially to each other, which realizes a particularly space saving construction arrangement. For example, the shafts spatially disposed in a successive manner may also be positioned at a slight offset to each other. In this arrangement a direct gear with transmission ratio one may be realized via gear engagement and may be positioned advantageously into the sixth to ninth gear in a relatively free manner. Other arrangement possibilities of the driveshaft and of the output shaft are also conceivable.

Preferably, the double clutch transmission is equipped with an integrated output step. The output step may comprise as the output gear a fixed gear on the driveshaft which is engaged both in a first output gear as the fixed gear of the first countershaft and in a second output gear as the fixed gear of the second countershaft. However, it is possible that at least one of the output gears is embodied as a shifting toothed gear.

Advantageously the lower forward gears and the reverse gears may be actuated via a starting or shifting clutch in order to thereby concentrate higher loads on the clutch and thereby be able to embody the second clutch in a more construction space saving and cost-effective manner. The gear planes may be disposed in the double clutch transmission provided such that startup can be achieved both via the internal transmission input shaft or also via the exterior transmission input shaft, and thereby via the respectively most suitable clutch, which is also enabled in a double clutch transmission configuration that is concentrically disposed and nestled. For this purpose the gear planes may be disposed or exchanged in a respective mirror inverted manner.

Regardless of the respective variant embodiment the gear planes provided in the double clutch transmission may, for example, be interchanged. It is also possible that two single gear planes are utilized instead of a dual gear plane, and/or vice versa.

BRIEF DESCRIPTION OF THE DRAWINGS

The present invention is explained in further detail below based on the drawings. They show:

FIG. 2 a shift pattern of the first variant embodiment according to FIG. 1;

FIG. 4 a shift pattern of the second variant embodiment according to FIG. 3;

FIG. 6 a shift pattern of the third variant embodiment according to FIG. 5;

FIG. 8 a shift pattern of the fourth variant embodiment according to FIG. 7;

FIG. 10 a shift pattern of the fifth variant embodiment according to FIG. 9;

FIG. 12 a shift pattern of the sixth variant embodiment according to FIG. 11;

FIG. 14 a shift pattern of the seventh variant embodiment according to FIG. 13;

FIG. 16 a shift pattern of the eighth variant embodiment according to FIG. 15;

FIG. 18 a shift pattern of the ninth variant embodiment according to FIG. 17;

FIG. 20 a shift pattern of the tenth variant embodiment according to FIG. 19;

DETAILED DESCRIPTION OF THE PREFERRED EMBODIMENTS

Figure 1:
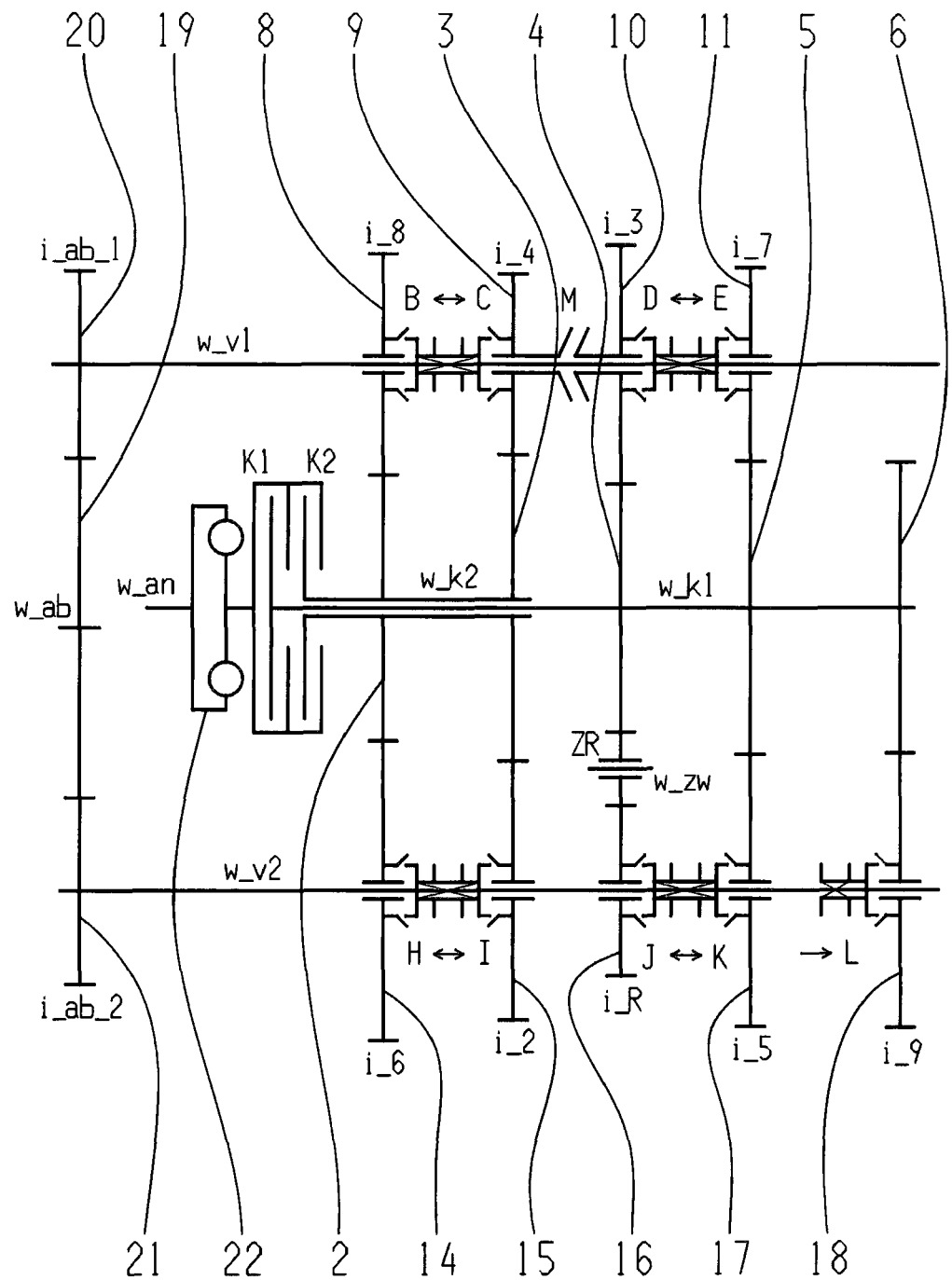
FIG. 1 a schematic view of a first variant embodiment of a nine-gear double clutch transmission according to the invention.

FIGS. 1, 3, 5, 7, 9, 11, 13, 15, 17, and 19 each show a possible variant embodiment of a nine-gear double clutch transmission. The respective shift patterns for the variant embodiments are illustrated in tabular format in FIGS. 2, 4, 6, 8, 10, 12, 14, 16, 18, and 20.

The nine-gear double clutch transmission comprises two clutches K1, K2, the input sides of which are connected to a driveshaft w_an, and the output sides of which are respectively connected to one of two transmission input shafts w_k1, w_k2 that are arranged coaxially to each other. Furthermore, a torsion vibration damper 22 may be disposed on the driveshaft w_an. Further, two countershafts w_v1, w_v2 are provided, on which toothed gearwheels embodied as idler gears 7, 8, 9, 10, 11, 12, 13, 14, 15, 16, 17, 18 are rotationally supported, and toothed gearwheels embodied as rotationally fixed gears 1, 2, 3, 4, 5, 6, which engage at least some of the idler gears 7, 8, 9, 10, 11, 12, 13, 14, 15, 16, 17, 18.

In order to be able to connect the idler gears 7, 8, 9, 10, 11, 12, 13, 14, 15, 16, 17, 18 to the respective countershaft w_v1, w_v2, a plurality of actuatable coupling devices A, B, C, D, E, F, G, H, I, J, K, L are provided on the countershafts w_v1, w_v2. Furthermore, output gears 20, 21 are disposed on both countershafts w_v1, w_v2 as constant pinions and which engage gearing of a fixed gear 19 of an output shaft w_ab.

In addition to the coupling devices A, B, C, D, E, F, G, H, I, J, K, L which realize a rotationally fixed connection between a toothed gearwheel and the associated countershaft w_v1, w_v2, at least one winding path gear shift element M, N is provided in the double clutch transmission for connecting two toothed gearwheels of one countershaft w_v1, w_v2 in a rotationally fixed manner such that at least one winding path gear is realized.

According to the invention only five gear planes are provided in the double clutch transmission, wherein in each variant embodiment at least four dual gear planes (7-13, 8-14, 9-15, 10-16, 11-17, 12-18) are provided such that at least one power shifting winding path gear can be shifted via at least one actuated shift element M, N. As the shift element M, N, for example, a claw or the like may be utilized for connecting two toothed gears or the like.

In the first, third, seventh, and ninth variant embodiments according to FIGS. 1, 5, 13, and 17 the shift element M is arranged on the first countershaft w_v1 to connect the idler gear 9 to the idler gear 10, if the shift element M is actuated. In contrast the shift element N is arranged on the second countershaft w_v2 in the fourth, sixth, eighth, and tenth variant embodiments according to FIGS. 7, 11, 15, and 19 to connect the idler gear 15 to the idler gear 16, if the shift element N is actuated. In the second and fifth variant embodiments of the invention according to FIGS. 3 and 9 one shift element M each is provided on the first countershaft w_v1 and a further shift element N is additionally provided on the second countershaft w_v2.

In the first, third, fifth, ninth, and tenth variant embodiment according to FIGS. 1, 5, 9, 17, and 19 the fixed gear 2 of the second transmission input shaft w_k2 meshes both with the idler gear 8 of the first countershaft w_v1 and the idler gear 14 of the second countershaft w_v2 in the first gear plane as dual gear plane 8-14. In the second gear plane as the dual gear plane 9-15, the fixed gear 3 is engaged with both the idler gear 9 of the first countershaft w_v1 and the idler gear 15 of the second countershaft w_v2. In the second variant embodiment according to FIG. 3 the fixed gear 1 of the second transmission input shaft w_k2 meshes in the first gear plane 7-13 as a dual gear plane, both with the idler gear 13 of the second countershaft w_v2 and an intermediate gear ZR of an intermediate shaft w_zw for the reversal of rotation to realize reverse gear transmission ratios, wherein the intermediate gear ZR engages the idler gear 7 of the first countershaft w_v1. The intermediate gear ZR is arranged on the countershaft w_zw in a rotatable manner, wherein the intermediate shaft w_zw is disposed parallel to the countershafts w_v1, w_v2. In the second gear plane 2-14 as a single gear plane, the fixed gear 2 of the second transmission input shaft w_k2 only meshes with the idler gear 14 of the second countershaft w_v2 in the second variant embodiment according to FIG. 3.

In the first variant embodiment according to FIG. 1, the fixed gear 4 of the first transmission input shaft w_k1 meshes both with the idler gear 10 of the first countershaft w_v1 and with an intermediate gear ZR of an intermediate shaft w_zw in the third gear plane 10-16 as a dual gear plane, for the reversal of rotation for realizing reverse gear transmission ratios. The intermediate gear ZR further meshes with the idler gear 16 of the second countershaft w_v2. In the fifth variant embodiment according to FIG. 9, the fixed gear 4 of the first transmission input shaft w_k1 meshes with the idler gear 16 of the second countershaft w_v2 and the intermediate gear ZR of the intermediate shaft w_zw. The intermediate gear ZR further meshes with the idler gear 10 of the first countershaft w_v1. Both in the first variant embodiment according to FIG. 1 and in the fifth variant embodiment according to FIG. 9, the fixed gear 5 of the first transmission input shaft w_k1 meshes with both the idler gear 11 of the first countershaft w_v1 and the idler gear 17 of the second countershaft w_v2 in the fourth gear plane 11-17 as a dual gear plane. In the fifth gear plane 6-18 as a single gear plane, the fixed gear 6 of the first transmission input shaft w_k1 meshes only with the idler gear 18 of the second countershaft w_v2 in the two previously mentioned variant embodiments.

Figure 3:
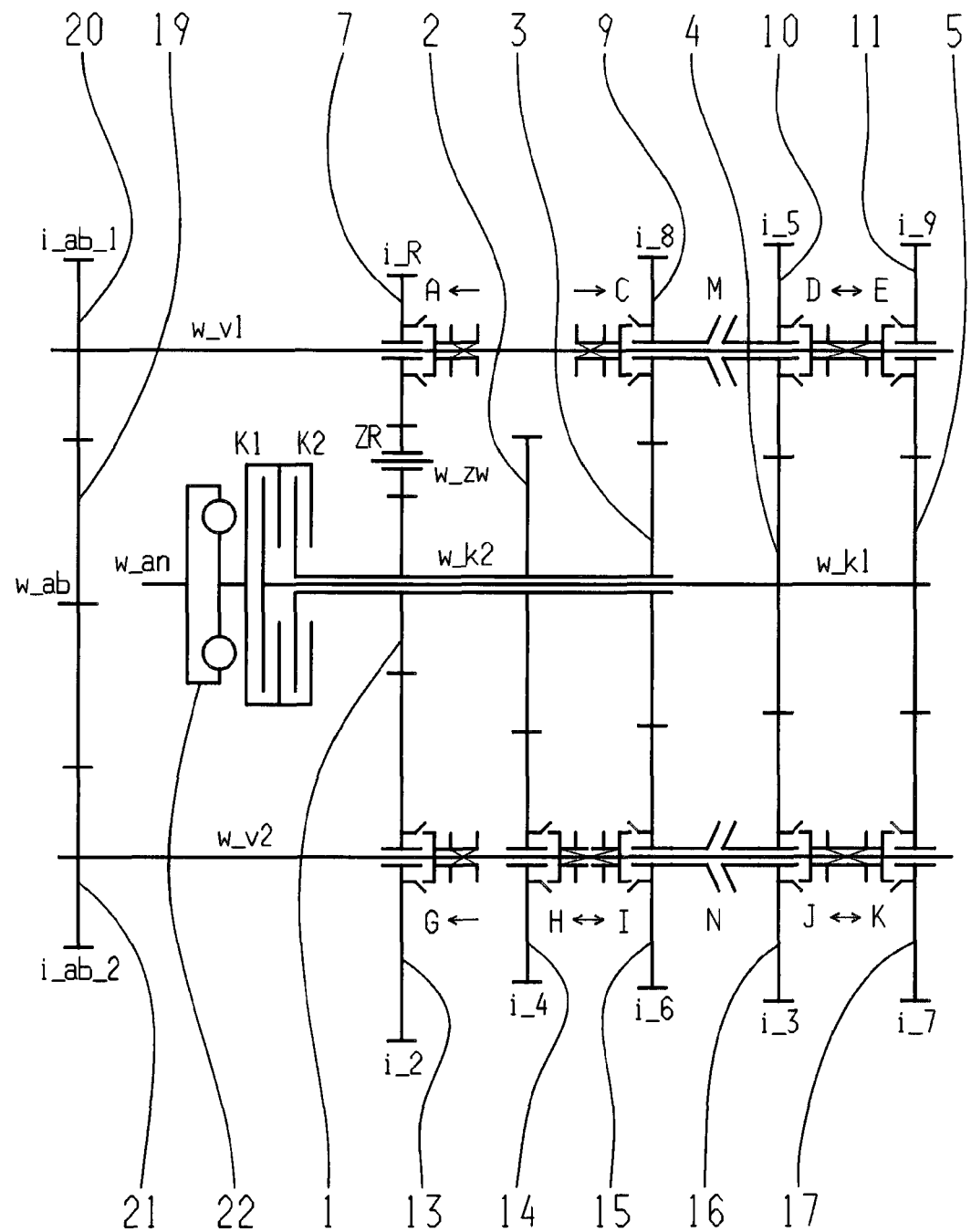
FIG. 3 a schematic view of a second variant embodiment of the nine-gear double clutch transmission according to the invention.

In the second variant embodiment according to FIG. 3, the fixed gear 3 of the second transmission input shaft w_k2 meshes with both the idler gear 9 of the first countershaft w_v1 and the idler gear 15 of the second countershaft w_v2 in the third gear plane 9-15 as a dual gear plane. In the fourth gear plane 10-16 as a dual gear plane, the fixed gear 4 of the first transmission input shaft w_k1 meshes with both the idler gear 10 of the first countershaft w_v1 and the idler gear 16 of the second countershaft w_v2. Finally, in the fifth gear plane 11-17 as a dual gear plane, the fixed gear 5 of the first transmission input shaft w_k1 meshes with both the idler gear 11 of the first countershaft w_v1 and the idler gear 17 of the second countershaft w_v2.

Figure 17:
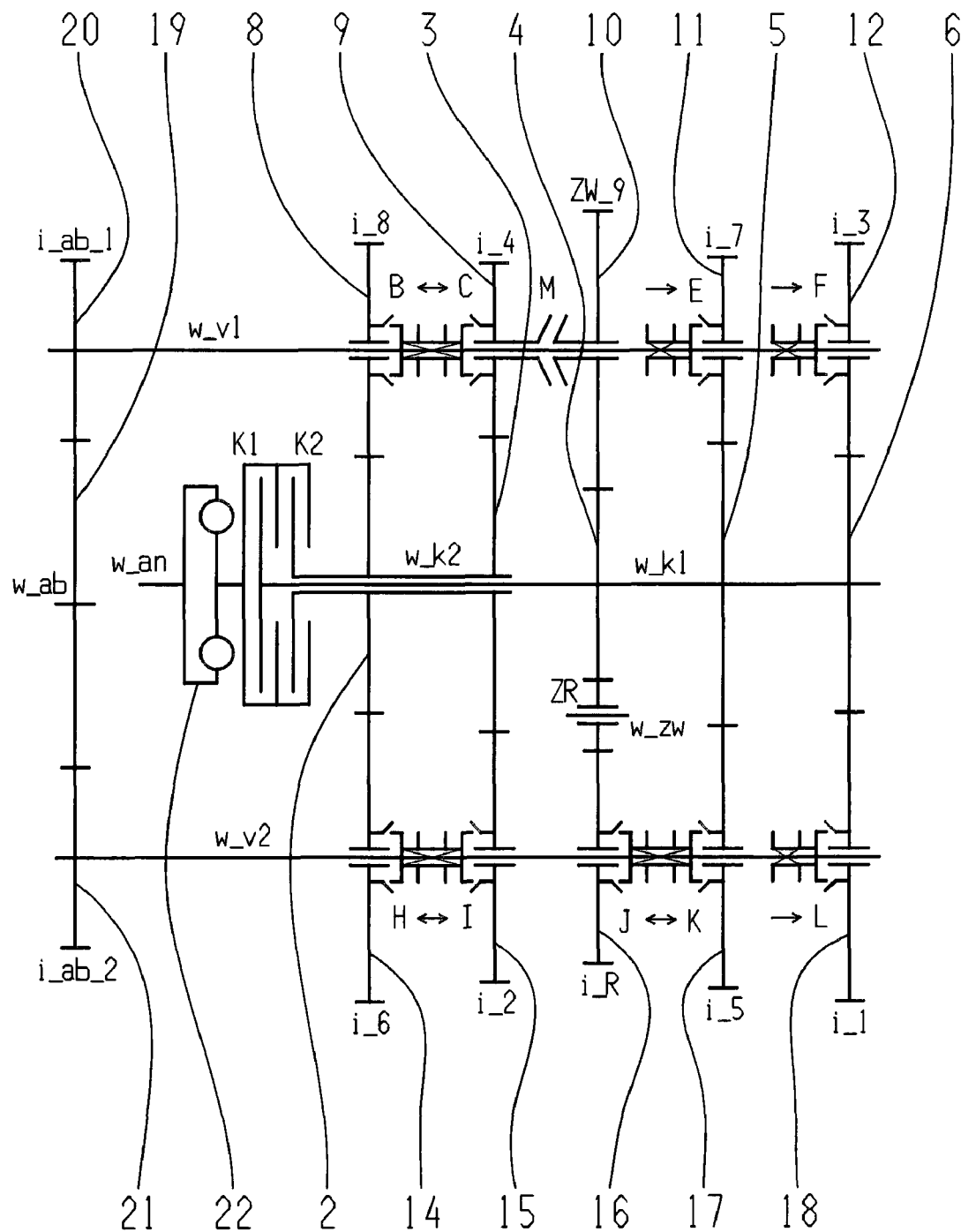
FIG. 17 a schematic view of a ninth variant embodiment of the nine-gear double clutch transmission according to the invention.
Figure 19:
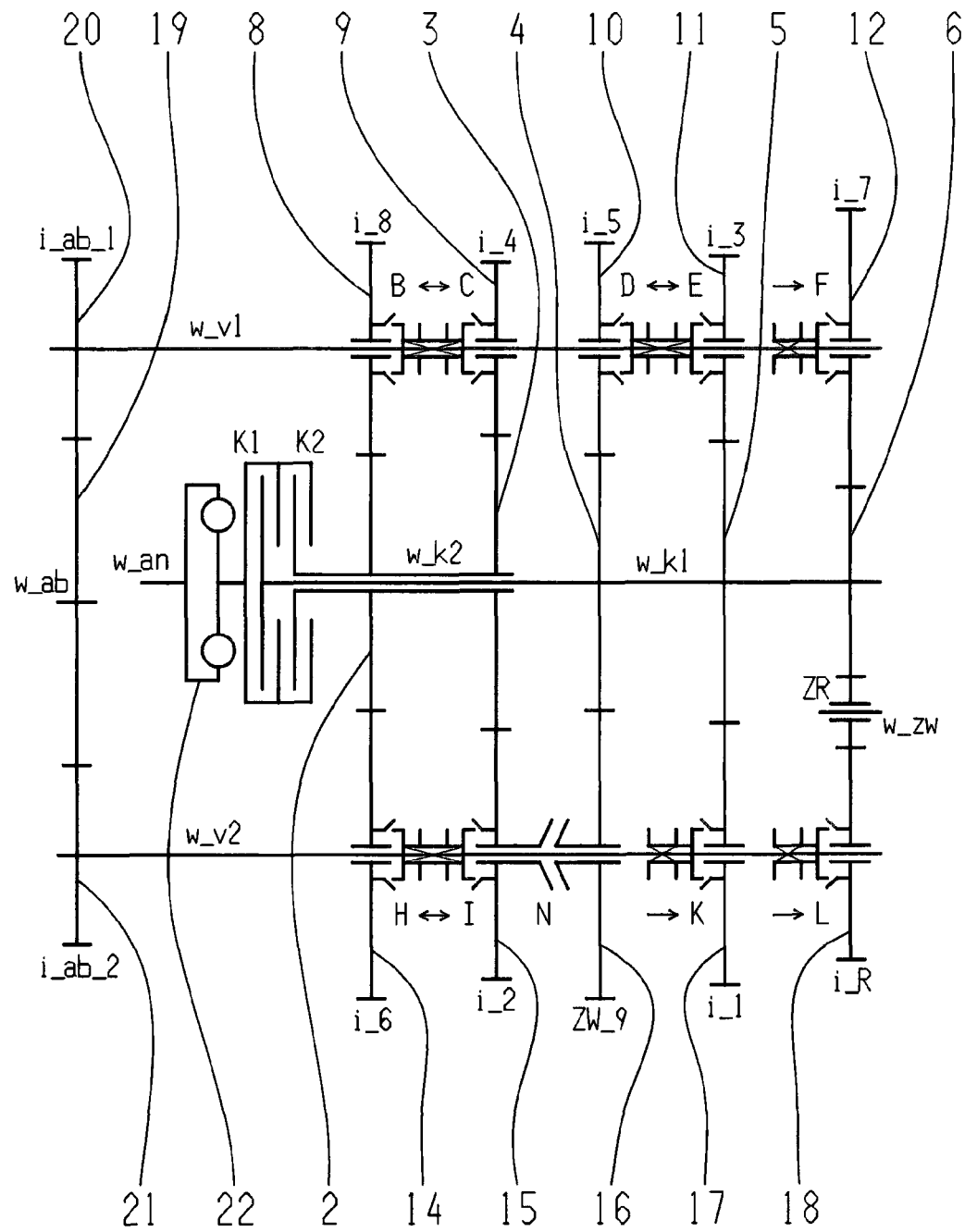
FIG. 19 a schematic view of a tenth variant embodiment of the nine-gear double clutch transmission according to the invention.

Furthermore, in the ninth variant embodiment according to FIG. 17 the fixed gear 4 of the first transmission input shaft w_k1 meshes with both the idler gear 10 of the first countershaft w_v1 and the intermediate gear ZR of the intermediate shaft w_zw in the third gear plane 10-16 as a dual gear plane, the intermediate gear ZR in turn is engaged with the idler gear 16 of the second countershaft w_v2. In the fourth gear plane 11-17 as a dual gear plane, the fixed gear 5 of the first transmission input shaft w_k1 meshes with both the idler gear 11 of the first countershaft w_v1 and the idler gear 17 of the second countershaft w_v2. Finally, in the fifth gear plane 12-18 as a dual gear plane, the fixed gear 6 of the first transmission input shaft w_k1 meshes with both the idler gear 12 of the first countershaft w_v1 and the idler gear 18 of the second countershaft w_v2. In contrast to the ninth variant embodiment, the intermediate gear ZR is provided in the fifth gear plane 12-18 in the tenth variant embodiment for the reversal of rotation such that the intermediate gear ZR in the tenth variant embodiment according to FIG. 19 is engaged with the fixed gear 6 of the transmission input shaft w_k1 and the idler gear 18 of the second countershaft w_v2.

Figure 5:
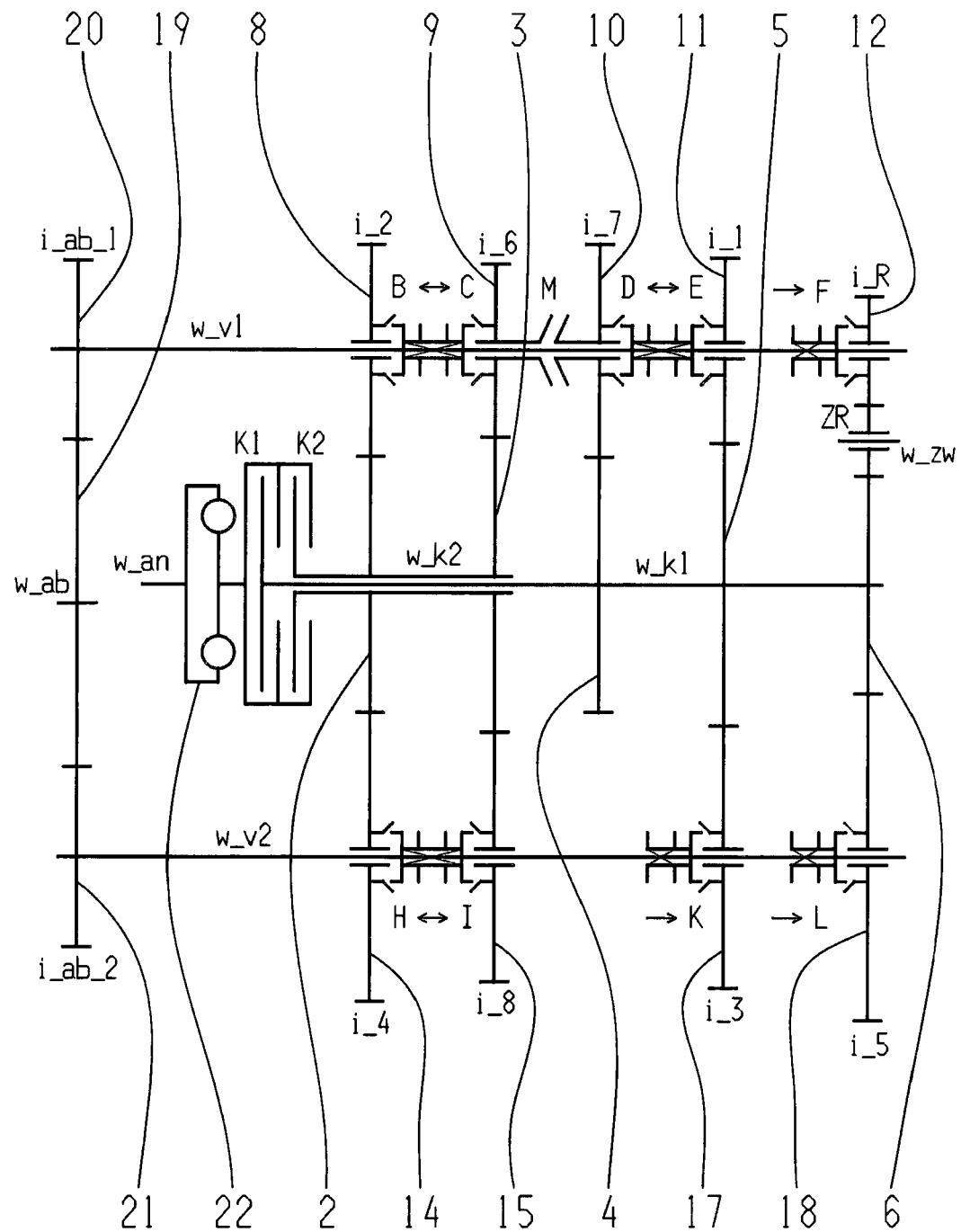
FIG. 5 a schematic view of a third variant embodiment of the nine-gear double clutch transmission according to the invention.

In the third variant embodiment according to FIG. 5, the fixed gear 4 of the first transmission input shaft w_k1 meshes only with the idler gear 10 of the first countershaft w_v1 in the third gear plane 10-4 as a single gear plane. In the fourth gear plane 11-17 as a dual gear plane, the fixed gear 5 of the first transmission input shaft w_k1 meshes with both the idler gear 11 of the first countershaft w_v1 and the idler gear 17 of the second countershaft w_v2. Finally, in the fifth gear plane 12-18 as a dual gear plane, the fixed gear 6 of the first transmission input shaft w_k1 meshes with both the idler gear 18 of the second countershaft w_v2 and the intermediate gear ZR of the intermediate shaft w_zw for the reversal of rotation. The intermediate gear ZR engages the idler gear 12 of the first countershaft w_v1.

Figure 7:
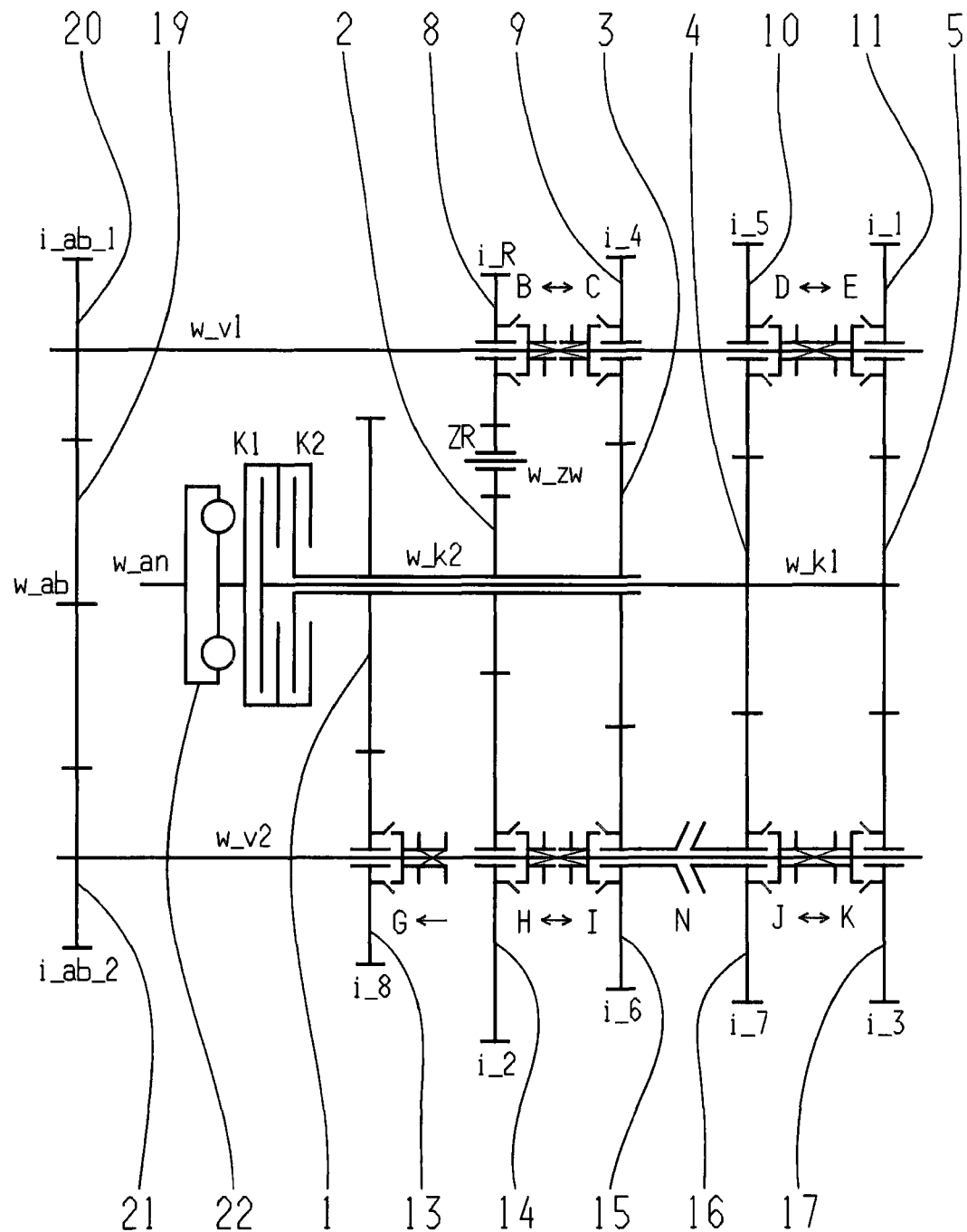
FIG. 7 a schematic view of a fourth variant embodiment of the nine-gear double clutch transmission according to the invention.
Figure 11:
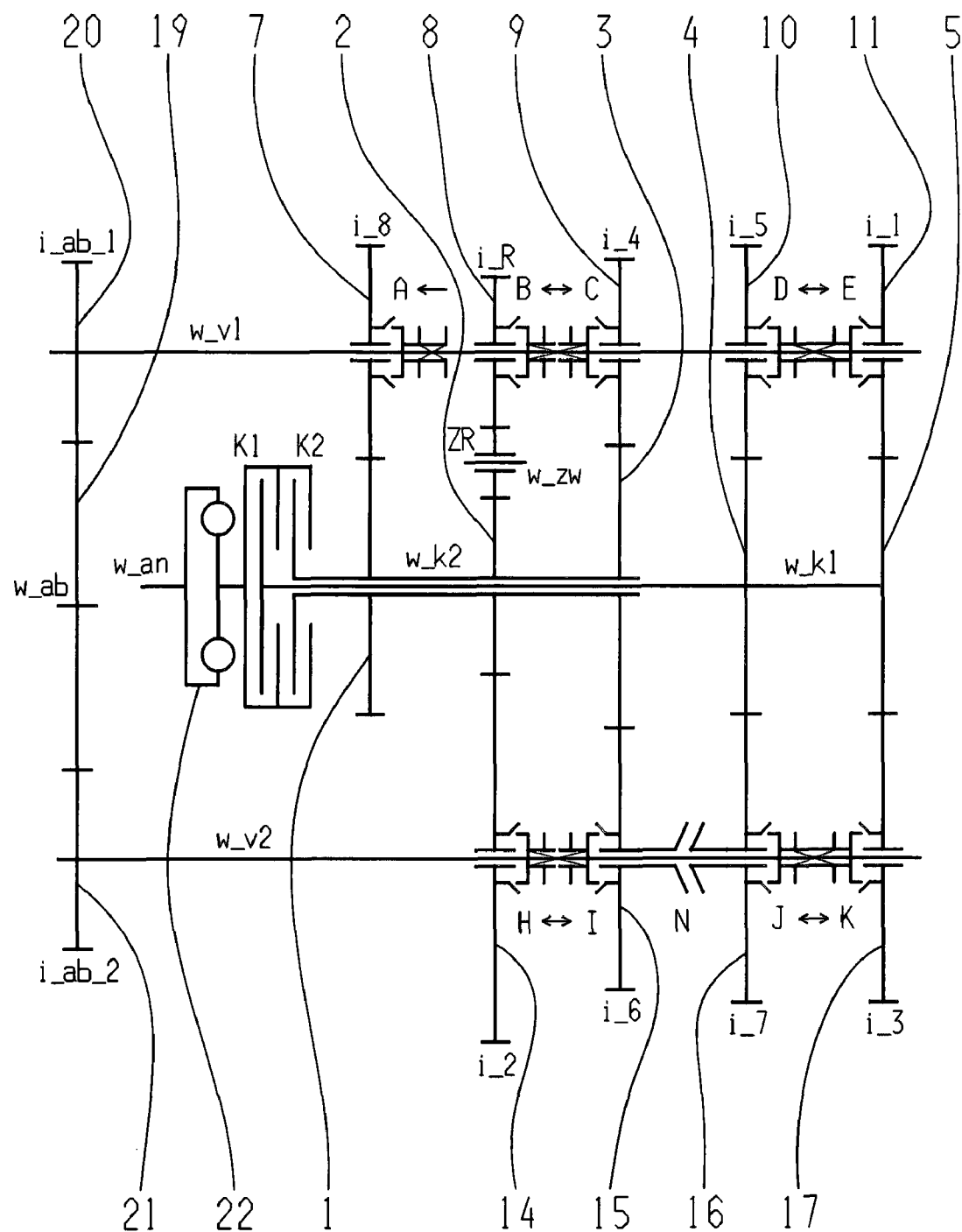
FIG. 11 a schematic view of a sixth variant embodiment of the nine-gear double clutch transmission according to the invention.

In the fourth and sixth variant embodiments according to FIGS. 7 and 11, the fixed gear 1 of the second transmission input shaft w_k2 meshes with either the idler gear 13 of the second countershaft w_v2 or with the idler gear 7 of the first countershaft w_v1 in the first gear plane 1-13 or 7-1, respectively, as a single gear plane. In the second gear plane 8-14 as a dual gear plane, the fixed gear 2 of the second transmission input shaft is engaged in the previously mentioned variant embodiments with both the idler gear 14 of the second countershaft w_v2 and the intermediate gear ZR of the intermediate shaft w_zw for the reversal of rotation for the reverse gear transmission ratios. The intermediate gear ZR in turn is engaged with the idler gear 8 of the first countershaft w_v1. In the third gear plane 9-15 as a dual gear plane, the fixed gear 3 of the second transmission input shaft w_k2 meshes with both the idler gear 9 of the first countershaft and the idler gear 15 of the second countershaft w_v2.

Figure 13:
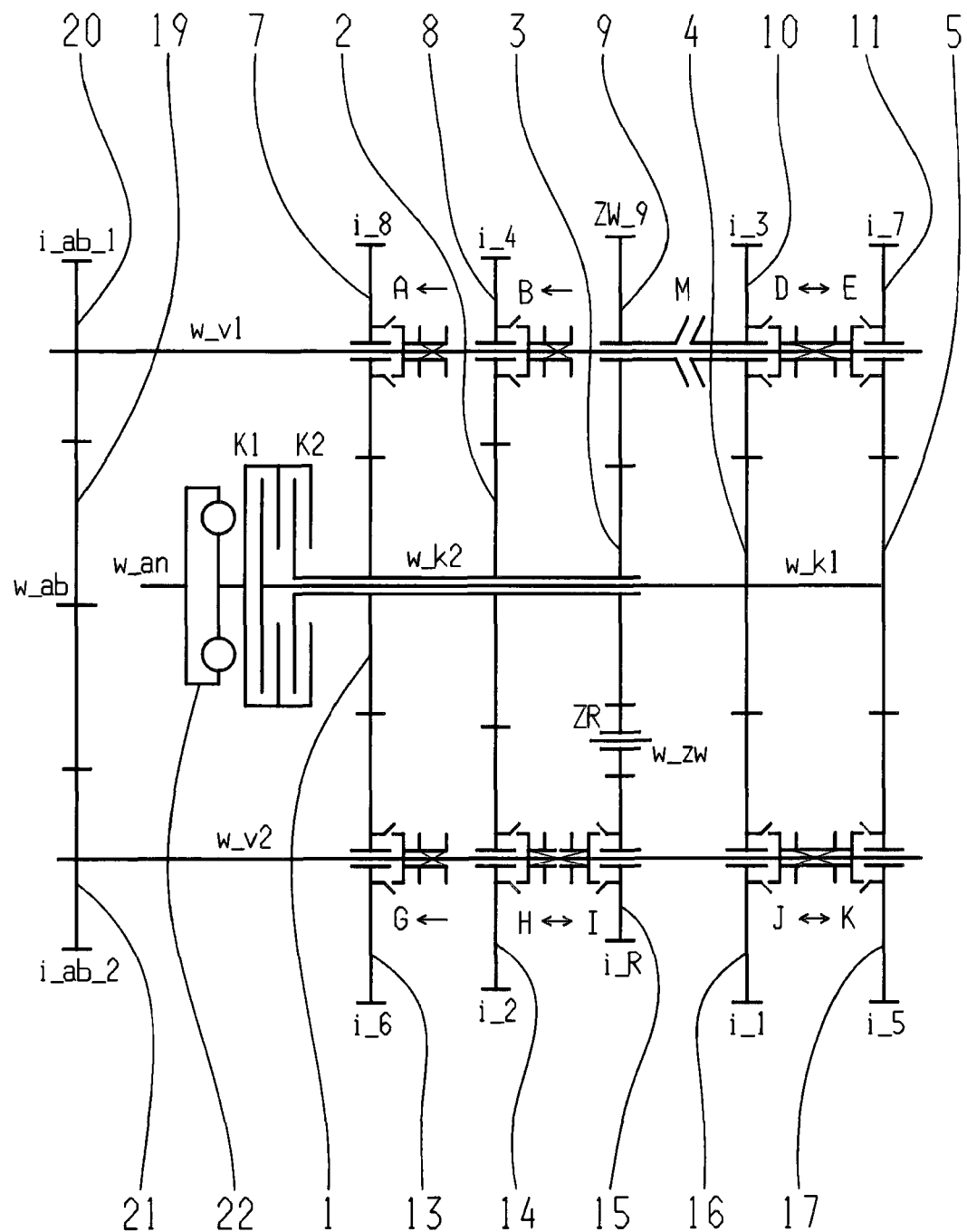
FIG. 13 a schematic view of a seventh variant embodiment of the nine-gear double clutch transmission according to the invention.
Figure 15:
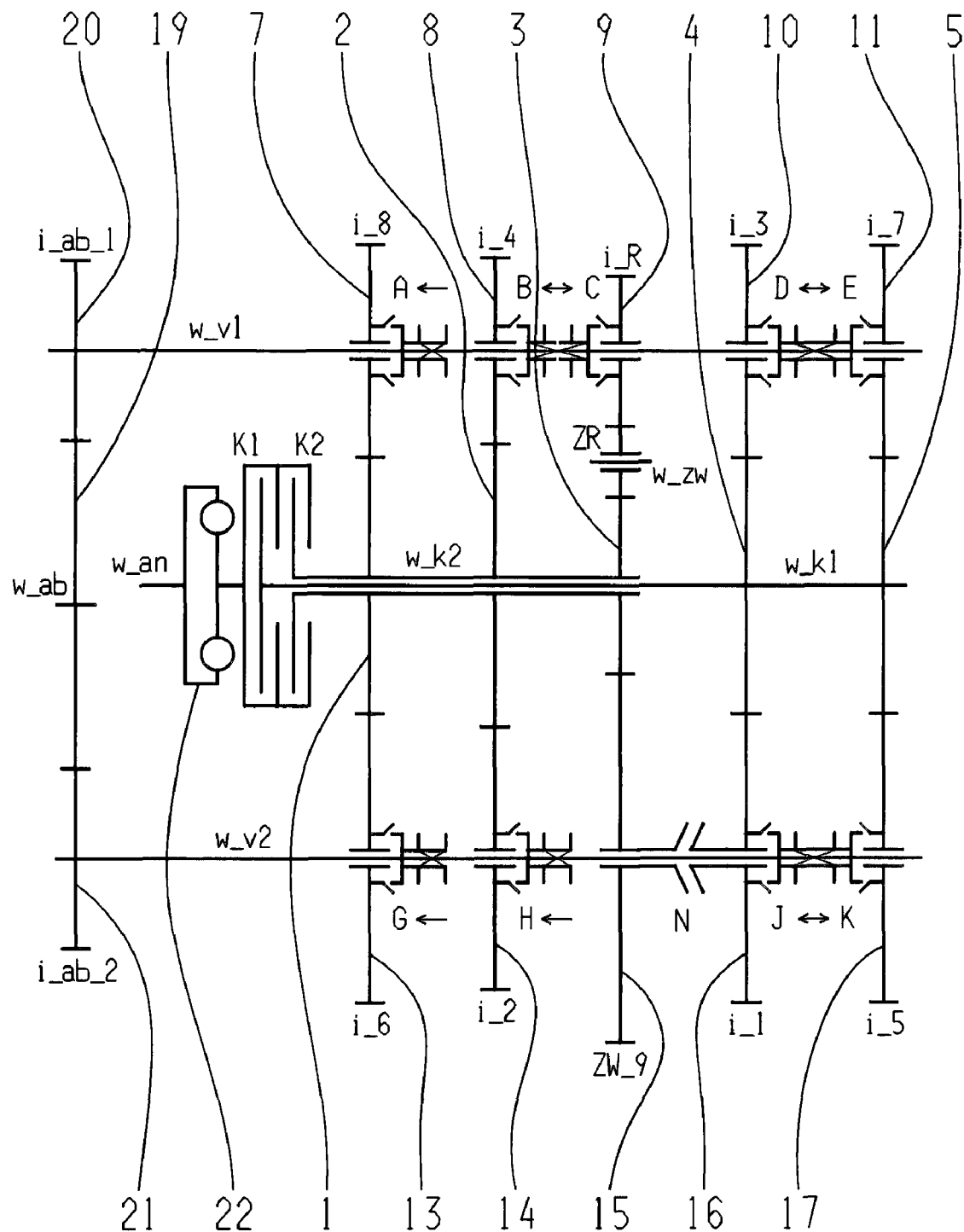
FIG. 15 a schematic view of an eighth variant embodiment of the nine-gear double clutch transmission according to the invention.

According to FIGS. 13 and 15 the seventh and eighth variant embodiments the fixed gear 1 of the second transmission input shaft w_k2 meshes with both the idler gear 7 of the first countershaft w_v1 and the idler gear 13 of the second countershaft w_v2 in the first gear plane 7-13 as a dual gear plane. In the second gear plane 8-14, as a dual gear plane, the fixed gear 2 of the second transmission input shaft w_k2 meshes with both the idler gear 8 of the first countershaft w_v2 and the idler gear 14 of the second countershaft w_v2. In the third gear plane 9-15 as a dual gear plane, the fixed gear 3 of the second transmission input shaft w_k2 meshes with both the idler gear 9 of the first countershaft w_v1 and the intermediate gear ZR of the intermediate shaft w_zw in the seventh variant embodiment, wherein the intermediate gear ZR in turn meshes with the idler gear 15 of the second countershaft w_v2. In the eighth variant embodiment, the fixed gear 3 meshes with the idler gear 15 of the second countershaft w_v2 and the intermediate gear ZR of the intermediate shaft w_zw, the intermediate gear ZR in turn meshes with the idler gear 9 of the first countershaft w_v1.

In the fourth, sixth, seventh, and eighth variant embodiments according to the FIGS. 7, 11, 13, and 15, the fixed gear 4 of the first transmission input shaft w_k1 meshes with both the idler gear 10 of the first countershaft w_v1 and the idler gear 16 of the second countershaft w_v2 in the fourth gear plane 10-16 as a dual gear plane. In the fifth gear plane 11-17 as a dual gear plane, the fixed gear 5 of the first transmission input shaft w_k1 meshes with both the idler gear 11 of the first countershaft w_v1 and the fixed gear 17 of the second countershaft w_v2.

According to the first, third, fifth, ninth, and tenth variant embodiments according to FIGS. 1, 5, 9, 17, and 19, bidirectionally operative coupling devices B-C, or H-I, respectively, are provided on the first countershaft w_v1 and on the second countershaft w_v2 between the first gear plane 8-14 and the second gear plane 9-15. On the first countershaft w_v1, the idler gear 8 is connected to the first countershaft w_v1 by means of the coupling device B, and the idler gear 9 is connected to the same by means of the coupling device C, if the respective coupling device B or C is actuated. On the second countershaft w_v2 the idler gear 14 is connected to the second countershaft w_v2 by means of the coupling device H, and the idler gear 15 is connected to the same by means of the coupling device I, if the coupling device H or the coupling device I, respectively, is actuated.

Furthermore, in the first variant embodiment according to FIG. 1, a bidirectionally operative coupling device D-E or J-K, respectively, is provided between the third gear plane 1-16 and the fourth gear plane 11-17 on the first countershaft w_v1 and on the second countershaft w_v2. On the first countershaft w_v1, the idler gear 10 is connected to the first countershaft w_v1 by means of the coupling device D, and the idler gear 11 is connected to the same by means of the coupling device E, if the coupling device D or E, respectively, is actuated. On the second countershaft w_v2, the fixed gear 16 is connected to the second countershaft w_v2 by means of the coupling device J, and the fixed gear 17 is firmly connected to the same by means of the coupling device K, if the coupling device J or K, respectively, is actuated. In the first variant embodiment according to FIG. 1, a unidirectionally operative coupling device L is further provided on the second countershaft w_v2 between the fourth gear plane 11-17 and the fifth gear plane 6-18, which firmly connects the fixed gear 18 to the second countershaft w_v2 in the actuated state.

In the third and tenth variant embodiments according to FIGS. 5 and 19, a bidirectionally operative coupling device D-E is associated with the first countershaft w_v1 and a unidirectionally operative coupling device K is associated with the second countershaft w_v2 between the third gear plane 10-4 or 10-16, respectively, and the fourth gear plane 11-17. The coupling device D connects the fixed gear 10 and the coupling device E connects the idler gear 11 firmly to the first countershaft w_v1, the coupling device K connects the idler gear 17 firmly to the second countershaft w_v2 in the actuated state. Furthermore, a unidirectionally operative coupling device F is associated with the first countershaft w_v1 and a unidirectionally operative coupling device L is associated with the second countershaft w_v2 between the fourth gear plane 11-17 and the fifth gear plane 12-18 in the third and tenth variant embodiments. In the actuated state the coupling device F may firmly connect the idler gear 12 to the first countershaft w_v1 and the coupling device L may firmly connect the idler gear 18 to the second countershaft w_v2 in the actuated state.

Figure 9:
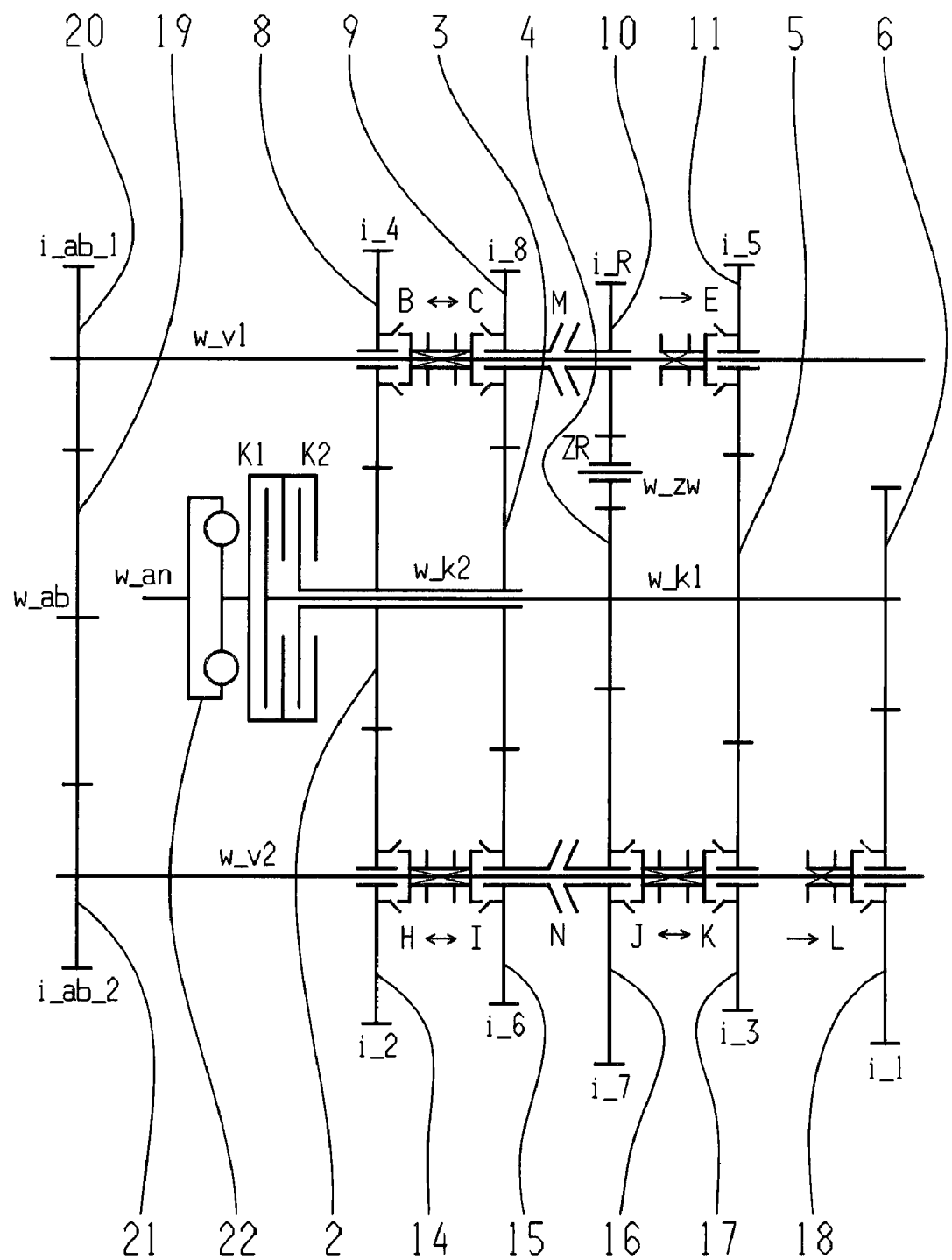
FIG. 9 a schematic view of a fifth variant embodiment of the nine-gear double clutch transmission according to the invention.

In the fifth and the ninth variant embodiments according to FIGS. 9 and 17, a unidirectionally operative coupling device E is associated with the first countershaft w_v1, and a bidirectionally operative coupling device J-K is associated with the second countershaft w_v2 between the third gear plane 10-16 and the fourth gear plane 11-17. The coupling device E connects the idler gear 11 to the first countershaft w_v1 in the actuated state. The coupling device J connects the idler gear 16 to the second countershaft w_v2 in the actuated state. The coupling device K firmly connects the idler gear 17 to the second countershaft w_v2 in the actuated state. Furthermore, a unidirectionally operative coupling device L is provided on the second countershaft w_v2 between the fourth gear plane 11-17 and the fifth gear plane 6-17 or 12-18, respectively, in order to firmly connect the idler gear 18 to the second countershaft w_v2 in the actuated state. Additionally, a unidirectionally operative coupling device F is provided on the first countershaft w_v1 in the ninth variant embodiment according to FIG. 17 in order to firmly connect the idler gear 12 to the first countershaft w_v1 in the actuated state.

According to FIGS. 3, 13, and 15, a unidirectionally operative coupling devices A and G are associated with the first countershaft w_v1 and the second countershaft w_v2 respectively, between the first gear plane 7-13 and the second gear plane 18-14 or 2-14 in the second, seventh, and eighth variant embodiments. The coupling device A can firmly connect the idler gear 7 to the first countershaft w_v1 in the actuated state, and the coupling device G can firmly connect the idler gear 13 to the second countershaft w_v2 in the actuated state.

In the fourth variant embodiment according to FIG. 7, a unidirectionally operative coupling device G is associated with the second countershaft w_v2 between the first gear plane 1-13 and the second gear plane 8-14, wherein the same firmly connects the idler gear 13 to the second countershaft w_v2 in the actuated state. In the sixth variant embodiment according to FIG. 11, a unidirectionally operative coupling device A is associated with the first countershaft w_v1 between the first gear plane 7-1 and the second gear plane 8-14, which firmly connects the idler gear 7 to the first countershaft w_v1 in the actuated state. Furthermore, a bidirectionally operative coupling device B-C or H-I, respectively, is associated with the first countershaft w_v1 or with the second countershaft w_v2, respectively, between the second gear plane 8-14 and the third gear plane 9-15 in these two variant embodiments, wherein the coupling device B firmly connects the idler gear 8 and the coupling device C firmly connects the idler gear 9 to the first countershaft w_v1, and the coupling device H firmly connects the idler gear 14, and the coupling device I firmly connects the idler gear 15 to the second countershaft w_v2.

In the second and seventh variant embodiments according to FIGS. 3 and 13 respectively, a unidirectionally operative coupling device C or B, is associated with the first countershaft w_v1, and a bidirectionally operative coupling device H-I is associated with the second countershaft w_v2 between the second gear plane 2-14 or 8-14, respectively, and the third gear plane 9-15. In the actuated state the coupling device C firmly connects the idler gear 9, and the coupling device B firmly connects the idler gear 8 to the first countershaft w_v1. In the actuated state the coupling device H firmly connects the idler gear 14, and the coupling device I firmly connects the idler gear 15 to the second countershaft w_v2 in the actuated state.

According to FIG. 15, a bidirectionally operative coupling device B-C is associated with the first countershaft w_v1, and a unidirectionally operative coupling device H is associated with the second countershaft between the second gear plane 8-14 and the third gear plane 9-15. In the actuated state the coupling device B firmly connects the idler gear 8, and the coupling device C firmly connects the idler gear 9 to the first countershaft w_v1 in the actuated state. The coupling device H firmly connects the idler gear 14 to the second countershaft w_v2 in the actuated state.

In the second, fourth, sixth, seventh, and eighth variant embodiments according to FIGS. 3, 7, 11, 13, and 15 a bidirectionally operative coupling device D-E or J-K, respectively, are associated with the first countershaft and the second countershaft between the fourth gear plane 10-16 and the gear plane 11-17. In the actuated state the coupling device D firmly connects the idler gear 10, and the coupling device E firmly connects the idler gear 11 to the first countershaft w_v1 in the actuated state. The coupling device J firmly connects the idler gear 16, and the coupling device K firmly connects the idler gear 17 to the second countershaft w_v2 in the actuated state.

An integrated output stage comprising the output gear 20, that is connected to the first countershaft w_v1 in a rotationally fixed manner, and comprising the output gear 21, which is connected to the second countershaft w_v2, may be provided in the double clutch transmission according to the invention. The output gear 20 and the output gear 21 each mesh with a fixed gear 19 of the power take-off shaft w_ab. However, it is also possible that a shiftable connection is realized between the output gear 20 or 21 and the associated countershaft w_v1 or w_v2.

Regardless of the respective variant embodiments the double clutch transmission is such that at least the forward gears G1 to G9 may be configured in a power shifting manner.

The table illustrated in FIG. 2 shows by way of example a shift pattern for the first variant embodiment of the nine-gear double clutch transmission according to FIG. 1.

It is obvious from the shift pattern that the first forward gear G1 may be shifted via the first clutch K1 and via the actuated coupling device I as well as via the actuated shift element M as the winding path gear, that the second forward gear G2 may be shifted via the second clutch K2 and via the actuated coupling device I, that the third forward gear G3 may be shifted via the first clutch K1 and via the actuated coupling device D, that the fourth forward gear G4 may be shifted via the second clutch K2 and via the actuated coupling device C, that the fifth forward gear G5 may be shifted via the first clutch K1 and via the actuated coupling device K, that the sixth forward gear G6 may be shifted via the second clutch K2 and via the actuated coupling device H, that the seventh forward gear G7 may be shifted via the first clutch K1 and via the actuated coupling device E, that the eighth forward gear G8 may be shifted via the second clutch K2 and via the actuated coupling device B, and that the ninth forward gear G9 may be shifted via the first clutch K1 and via the actuated coupling device L.

In the first variant embodiment it is further obvious from the table illustrated in FIG. 2 that a reverse gear R1 may be shifted via the first clutch K1 and via the actuated coupling device J. Furthermore, an overdrive gear O1 may be shifted via the second clutch K2, via the actuated coupling device L, and via the actuated shift element M as the winding path gear in the double clutch transmission provided according to the first variant embodiment. Advantageously, shifting may be carried out under load, e.g. without any traction force interruption, between the overdrive gear O1 and the ninth forward gear G9.

The table illustrated in FIG. 4 shows a shift pattern for the second variant embodiment of the nine-gear double clutch transmission according to FIG. 3 by way of example.

The shift pattern shows that the first forward gear G1 may be shifted via the first clutch K1 and via the actuated coupling device G as well as via the actuated shift element M as the winding path gear, that the second forward gear G2 may be shifted via the second clutch K2 and via the actuated coupling device G, that the third forward gear G3 may be shifted via the first clutch K1 and via the actuated coupling device J, that the fourth forward gear G4 may be shifted via the second clutch K2 and via the actuated coupling device H, that the fifth forward gear G5 may be shifted via the first clutch K1 and via the actuated coupling device D, that the sixth forward gear G6 may be shifted via the second clutch K2 and via the actuated coupling device I, that the seventh forward gear G7 may be shifted via the first clutch K1 and via the actuated coupling device K, that the eighth forward gear G8 may be shifted via the second clutch K2 and via the actuated coupling device C, and that the ninth forward gear G9 may be carried out via the first clutch K1 and via the actuated coupling device E.

In the second variant embodiment it is further obvious from the table illustrated in FIG. 4 that a reverse gear R1 may be shifted via the first clutch K1 and via the actuated coupling device A as well as via the actuated shift element N as the winding path gear. Furthermore, a crawler gear C1 may be shifted via the first clutch K1 and via the actuated coupling device G as well as via the actuated shift element N as the winding path gear.

Furthermore, according to the second variant embodiment, an overdrive gear O1 may be shifted in the provided double clutch transmission via the second clutch K2, via the actuated coupling device E, and via the actuated shift element M as the winding path gear. Advantageously, shifting may be carried out between the overdrive gear O1 and the ninth forward gear G9 under load. Furthermore, the invention may alternatively or additionally provide that a further overdrive gear O2 is shifted via the second clutch K2, via the actuated coupling device K, and via the actuated shift element M as the winding path gear, that a subsequent overdrive gear O3 is shifted via the second clutch K2, via the actuated coupling device E, and via the actuated shift element N as the winding path gear, which is also embodied in a power shifting manner toward the ninth forward gear G9, that a further overdrive gear O4 is shifted via the second clutch K2, via the actuated coupling device D, and via the actuated shift element N as the winding path gear, and that a subsequent overdrive gear O5 is shifted via the second clutch K2, via the actuated coupling device K, and via the actuated shift element N as the winding path gear.

The table illustrated in FIG. 6 shows a shift pattern for the third variant embodiment of the nine-gear double clutch transmission according to FIG. 5 by way of example.

The shift pattern shows that the first forward gear G1 may be shifted via the first clutch K1 and via the actuated coupling device E, that the second forward gear G2 may be shifted via the second clutch K2 and via the actuated coupling device B, that the third forward gear G3 may be shifted via the first clutch K1 and via the actuated coupling device K, that the fourth forward gear G4 may be shifted via the second clutch K2 and via the actuated coupling device H, that the fifth forward gear G5 may be shifted via the first clutch K1 and via the actuated coupling device L, that the sixth forward gear G6 may be shifted via the second clutch K2 and via the actuated coupling device C, that the seventh forward gear G7 may be shifted via the first clutch K1 and via the actuated coupling device D, that the eighth forward gear G8 may be shifted via the second clutch K2 and via the actuated coupling device I, and that the ninth forward gear G9 may be carried out via the first clutch K1 and via the actuated coupling device I and via the actuated shift element M as the winding path gear.

In the third variant embodiment it is also obvious from the table illustrated in FIG. 6 that a reverse gear R1 may be shifted via the second clutch K2 and via the actuated coupling device F and via the actuated shift element M as the winding path gear.

The table illustrated in FIG. 8 shows a shift pattern for the fourth variant embodiment of the nine-gear double clutch transmission according to FIG. 7 by way of example.

The shift pattern shows that the first forward gear G1 may be shifted via the first clutch K1 and via the actuated coupling device E, that the second forward gear G2 may be shifted via the second clutch K2 and via the actuated coupling device H, that the third forward gear G3 may be shifted via the first clutch K1 and via the actuated coupling device K, that the fourth forward gear G4 may be shifted via the second clutch K2 and via the actuated coupling device C, that the fifth forward gear G5 may be shifted via the first clutch K1 and via the actuated coupling device D, that the sixth forward gear G6 may be shifted via the second clutch K2 and via the actuated coupling device I, that the seventh forward gear G7 may be shifted via the first clutch K1 and via the actuated coupling device J, that the eighth forward gear G8 may be shifted via the second clutch K2 and via the actuated coupling device G, and that the ninth forward gear G9 may be carried out via the first clutch K1 and via the actuated coupling device G and via the actuated shift element N as the winding path gear.

In the fourth variant embodiment the table illustrated in FIG. 8 shows that a reverse gear R1 may be shifted via the second clutch K2 and via the actuated coupling device B, and/or that a further reverse gear R2 may be shifted via the first clutch K1 and via the actuated coupling device B and via the actuated shift element N as the winding path gear. Advantageously, the reverse gears R1 and R2 may be power shifted to each other. Furthermore, a crawler gear C1 may be shifted via the second clutch K2 and via the actuated coupling device E and via the actuated shift element N as the winding path gear, wherein the crawler gear C1 and the first forward gear G1 may be power shifted to each other.

Furthermore, according to the fourth variant embodiment, an overdrive gear O1 may be shifted in the provided double clutch transmission via the first clutch K1, via the actuated coupling device G, and via the actuated shift element M as the winding path gear.

The table illustrated in FIG. 10 shows a shift pattern for the fifth variant embodiment of the nine-gear double clutch transmission according to FIG. 9 by way of example.

The shift pattern shows that the first forward gear O1 may be shifted via the first clutch K1 and via the actuated coupling device L, that the second forward gear G2 may be shifted via the second clutch K2 and via the actuated coupling device H, that the third forward gear G3 may be shifted via the first clutch K1 and via the actuated coupling device K, that the fourth forward gear G4 may be shifted via the second clutch K2 and via the actuated coupling device B, that the fifth forward gear G5 may be shifted via the first clutch K1 and via the actuated coupling device E, that the sixth forward gear G6 may be shifted via the second clutch K2 and via the actuated coupling device I, that the seventh forward gear G7 may be shifted via the first clutch K1 and via the actuated coupling device J, that the eighth forward gear G8 may be shifted via the second clutch K2 and via the actuated coupling device C, and that the ninth forward gear G9 may be carried out via the first clutch K1 and via the actuated coupling device C and via the actuated shift element N as the winding path gear.

In the fifth variant embodiment the table illustrated in FIG. 10 also shows that a reverse gear R1 may be shifted via the second clutch K2 and via the actuated coupling device L and via the actuated shift element M as the winding path gear. Therefore, the reverse gear R1 and the first forward gear G1 may be power shifted to each other. Furthermore, a crawler gear C1 may be shifted via the second clutch K2 and via the actuated coupling device L and via the actuated shift element N as the winding path gear. The crawler gear C1 and the first forward gear G1 may also be power shifted to each other (C1 Isb. to G1).

The table illustrated in FIG. 12 shows a shift pattern for the sixth variant embodiment of the nine-gear double clutch transmission according to FIG. 11 by way of example.

The shift pattern shows that the first forward gear G1 may be shifted via the first clutch K1 and via the actuated coupling device E, that the second forward gear G2 may be shifted via the second clutch K2 and via the actuated coupling device H, that the third forward gear G3 may be shifted via the first clutch K1 and via the actuated coupling device K, that the fourth forward gear G4 may be shifted via the second clutch K2 and via the actuated coupling device C, that the fifth forward gear G5 may be shifted via the first clutch K1 and via the actuated coupling device D, that the sixth forward gear G6 may be shifted via the second clutch K2 and via the actuated coupling device I, that the seventh forward gear G7 may be shifted via the first clutch K1 and via the actuated coupling device J, that the eighth forward gear G8 may be shifted via the second clutch K2 and via the actuated coupling device A, and that the ninth forward gear G9 may be carried out via the first clutch K1 and via the actuated coupling device A and via the actuated shift element N as the winding path gear.

In the sixth variant embodiment the table illustrated in FIG. 12 shows that a reverse gear R1 (R1 Isb. to G1) may be shifted via the second clutch K2 and via the actuated coupling device B, and/or that a further reverse gear R2 (R2 Isb. to R1) may be shifted via the first clutch K1 and via the actuated coupling device B and via the actuated shift element N as the winding path gear. Furthermore, a crawler gear C1 may be realized via the second clutch K2 and via the actuated coupling device E and via the actuated shift element M as the winding path gear. As an alternative, or additionally a further crawler gear C2 (C2 Isb. to G1) may be power shifted via the second clutch K2 and via the actuated coupling device E and via the actuated shift element N as the winding gear.

The table illustrated in FIG. 14 shows a shift pattern for the seventh variant embodiment of the nine-gear double clutch transmission according to FIG. 13 by way of example.

The shift pattern shows that the first forward gear G1 may be shifted via the first clutch K1 and via the actuated coupling device J, that the second forward gear G2 may be shifted via the second clutch K2 and via the actuated coupling device H, that the third forward gear G3 may be shifted via the first clutch K1 and via the actuated coupling device D, that the fourth forward gear G4 may be shifted via the second clutch K2 and via the actuated coupling device B, that the fifth forward gear G5 may be shifted via the first clutch K1 and via the actuated coupling device K, that the sixth forward gear G6 may be shifted via the second clutch K2 and via the actuated coupling device G, that the seventh forward gear G7 may be shifted via the first clutch K1 and via the actuated coupling device E, that the eighth forward gear G8 may be shifted via the second clutch K2 and via the actuated coupling device A, and that the ninth forward gear G9 may be carried out via the first clutch K1 and via the actuated coupling device A and via the actuated shift element M as the winding path gear.

In the seventh variant embodiment the table illustrated in FIG. 14 shows that a reverse gear R1 may be shifted via the first clutch K1 and via the actuated coupling device I and via the actuated shift element M as the winding path gear, and/or that a further reverse gear R2 may be shifted via the first clutch K1 and via the actuated coupling device H and via the actuated shift element N as the winding path gear.

The table illustrated in FIG. 16 shows a shift pattern for the eighth variant embodiment of the nine-gear double clutch transmission according to FIG. 15 by way of example.

The shift pattern shows that the first forward gear G1 may be shifted via the first clutch K1 and via the actuated coupling device J, that the second forward gear G2 may be shifted via the second clutch K2 and via the actuated coupling device H, that the third forward gear G3 may be shifted via the first clutch K1 and via the actuated coupling device D, that the fourth forward gear G4 may be shifted via the second clutch K2 and via the actuated coupling device B, that the fifth forward gear G5 may be shifted via the first clutch K1 and via the actuated coupling device K, that the sixth forward gear G6 may be shifted via the second clutch K2 and via the actuated coupling device G, that the seventh forward gear G7 may be shifted via the first clutch K1 and via the actuated coupling device E, that the eighth forward gear G8 may be shifted via the second clutch K2 and via the actuated coupling device A, and that the ninth forward gear G9 may be realized via the first clutch K1 and via the actuated coupling device A and via the actuated shift element N as the winding path gear.

In the eighth variant embodiment the table illustrated in FIG. 16 shows that a reverse gear R1 (R1 Isb. to G1) may be shifted via the second clutch K2 and via the actuated coupling device C, and/or that a subsequent reverse gear R2 may be realized via the second clutch K2 and via the activated coupling device J and via the actuated shift element M as the winding path gear (R2 Isb. to G), and/or that a further reverse gear R3 may be carried out via the first clutch K1 and via the actuated coupling device I and via the actuated shift element M as the winding path gear, and/or that a subsequent reverse gear R4 (R4 (Isb.) power shifted to R1) may be carried out via the first clutch K1 and via the actuated coupling device C and via the actuated shift element N as the winding path gear.

The table illustrated in FIG. 18 shows a shift pattern for the eighth variant embodiment of the nine-gear double clutch transmission according to FIG. 17 by way of example.

The shift pattern shows that the first forward gear G1 may be shifted via the first clutch K1 and via the actuated coupling device L, that the second forward gear G2 may be shifted via the second clutch K2 and via the actuated coupling device I, that the third forward gear G3 may be shifted via the first clutch K1 and via the actuated coupling device F, that the fourth forward gear G4 may be shifted via the second clutch K2 and via the actuated coupling device C, that the fifth forward gear G5 may be shifted via the first clutch K1 and via the actuated coupling device K, that the sixth forward gear G6 may be shifted via the second clutch K2 and via the actuated coupling device H, that the seventh forward gear G7 may be shifted via the first clutch K1 and via the actuated coupling device E, that the eighth forward gear G8 may be shifted via the second clutch K2 and via the actuated coupling device B, and that the ninth forward gear G9 may be carried out via the first clutch K1 and via the actuated coupling device B and via the actuated shift element M as the winding path gear.

In the ninth variant embodiment the table illustrated in FIG. 18 shows that a reverse gear R1 may be shifted via the second clutch K2 and via the actuated coupling device J and via the actuated shift element M as the winding path gear, and/or that a further reverse gear R2 (R2 Isb. to G1) may be shifted via the second clutch K2 and via the actuated coupling device L and via the actuated shift element N as the winding path gear. Furthermore, a crawler gear C1 (C1 Isb. to G1) may be shifted via the second clutch K2 and via the actuated coupling device L and via the actuated shift element M as the winding path gear.

The table illustrated in FIG. 20 shows a shift pattern for the eighth variant embodiment of the nine-gear double clutch transmission according to FIG. 19 by way of example.

The shift pattern shows that the first forward gear G1 may be shifted via the first clutch K1 and via the actuated coupling device K, that the second forward gear G2 may be shifted via the second clutch K2 and via the actuated coupling device I, that the third forward gear G3 may be shifted via the first clutch K1 and via the actuated coupling device E, that the fourth forward gear G4 may be shifted via the second clutch K2 and via the actuated coupling device C, that the fifth forward gear G5 may be shifted via the first clutch K1 and via the actuated coupling device D, that the sixth forward gear G6 may be shifted via the second clutch K2 and via the actuated coupling device H, that the seventh forward gear G7 may be shifted via the first clutch K1 and via the actuated coupling device F, that the eighth forward gear G8 may be shifted via the second clutch K2 and via the actuated coupling device B, and that the ninth forward gear G9 may be carried out via the first clutch K1 and via the actuated coupling device B and via the actuated shift element N as the winding path gear.

In the tenth variant embodiment the table illustrated in FIG. 20 shows that a reverse gear R1 may be shifted via the first clutch K1 and via the actuated coupling device L, and/or that a further reverse gear R2 (R2 Isb. to R1) may be shifted via the second clutch K2 and via the actuated coupling device L and via the actuated shift element M as the winding path gear, and/or that a subsequent reverse gear R3 (R3 Isb. to R1) may be shifted via the second clutch K2 and via the actuated coupling device L and via the actuated shift element N as the winding path gear. Furthermore, a crawler gear C1 (C1 Isb. to G1) may be shifted via the second clutch K2 and via the actuated coupling device K and via the actuated shift element M as the winding path gear. As an alternative, or additionally a further crawler gear C2 (C2 Isb. to G1) may also be shifted via the second clutch K2 and via the actuated coupling device K and via the actuated shift element N as the winding path gear. Additionally, an overdrive gear O1 may be shifted via the first clutch K1 and via the actuated coupling device B and via the actuated shift element M as the winding path gear.

The shift pattern according to FIG. 2 shows in detail that in the first forward gear G1 based on the first clutch K1 the gear stages i_3, i_4, and i_2 are utilized, wherein the two subtransmissions are coupled via the shift element M in the first variant embodiment. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_9 in the ninth forward gear G9. Also, the gear stage i_R is utilized in the reverse gear R1. Based on the second clutch K2 the gear stages i_4, i_3, and i_9 are utilized with the overdrive gear O1, wherein the two subtransmissions are coupled via the shift element M.

The shift pattern according to FIG. 4 shows in detail that in the first forward gear O1 based on the first clutch K1 the gear stages i_5, i_8, and i_2 are utilized, wherein the two subtransmissions are coupled via the shift element M in the first variant embodiment. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_9 in the ninth forward gear G9. Also, based on the first clutch K1 the gear stages i_3, i_6, and i_R are utilized with the reverse gear R1, wherein the two subtransmissions are coupled via the shift element N. Based on the first clutch K1 the gear stages i_3, i_6, and i_2 are utilized in the crawler gear C1, wherein the two subtransmissions are coupled via the shift element N. Based on the second clutch K2 the gear stages i_8, i_5, and i_9 are utilized in the overdrive gear O1, wherein the two subtransmissions are coupled via the shift element M. In the further overdrive gear O2, based on the second clutch K2, the gear stages i_8, i_5, and i_7 are utilized, wherein the two subtransmissions are coupled via the shift element M. Based on the second clutch K2 the gear stages i_6, i_3, and i_9 are utilized in the overdrive gear O3. Based on the second clutch K2 the gear stages i_6, i_3, and i_5 are utilized in the overdrive gear O4. Finally, based on the second clutch K2 the toothed gear drives i_6, i_3, and i_7 are utilized in the overdrive gear O5. In the overdrive gears O3 to O5 the shift element N is utilized for coupling the two subtransmissions.

The shift pattern according to FIG. 6 shows in detail that in the first forward gear G1 the gear stage i_1 is utilized. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_7, i_6, and i_8 in the ninth forward gear G9 based on the first clutch K1, wherein the two subtransmissions are coupled via the shift element M. Also, based on the second clutch K2 the gear stages i_6, i_7, and i_R are utilized with the reverse gear R1, wherein the two subtransmissions are coupled via the shift element M.

The shift pattern according to FIG. 8 shows in detail that in the first forward gear G1 the gear stage i_1 is utilized. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_7, i_6, and i_8 in the ninth forward gear G9 based on the first clutch K1, wherein the two subtransmissions are coupled via the shift element N. Also, in the reverse gear R1 the gear stage i_R is utilized. In the further reverse gear R2, based on the first clutch K1, the gear stages i_7, i_6, and i_R are utilized, wherein the two subtransmissions are coupled via the shift element N. Based on the second clutch K2 the gear stages i_6, i_7, and i_1 are utilized in the crawler gear C1, wherein the two subtransmissions are coupled via the shift element N. Finally, based on the first clutch K1 the gear stages i_5, i_4, and i_8 are utilized in the overdrive gear O1, wherein the two subtransmissions are coupled via the shift element M.

The shift pattern according to FIG. 10 shows in detail that in the first forward gear G1 the gear stage i_1 is utilized. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_7, i_6, and i_8 in the ninth forward gear G9 based on the first clutch K1, wherein the two subtransmissions are coupled via the shift element N. Also, based on the second clutch K2 the gear stages i_8, i_R, and i_1 are utilized with the reverse gear R1, wherein the two subtransmissions are coupled via the shift element M. Based on the second clutch K2 the gear stages i_6, i_7, and i_1 are utilized in the crawler gear C1, wherein the two subtransmissions are coupled via the shift element N.

In contrast to the shift pattern according to FIG. 10, the gear stage i_R is utilized in the reverse gear R1, and in the further reverse gear R2, based on the first clutch K1, the gear stages i_7, i_6, and i_R are utilized in the R2 in the shift pattern according to FIG. 12, wherein the shift element N is utilized for coupling the two subtransmissions. A further difference is that based on the second clutch K2 the gear stages i_4, i_5, and i_1 are utilized in the crawler gear C1, wherein the two subtransmissions are coupled via the shift element M, and that based on the second clutch K2 the gear stages i_6, i_7, and i_1 are utilized in the crawler gear C2, wherein the two subtransmissions are coupled via the shift element N.

The shift pattern according to FIG. 14 shows in detail that in the first forward gear G1 the gear stage i_1 is utilized. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_3, zw_9, and i_8 in the ninth forward gear G9 based on the first clutch K1, wherein the two subtransmissions are coupled via the shift element M. Also, based on the first clutch K1 the gear stages i_3, zw_9, and i_R are utilized with the reverse gear R1, wherein the two subtransmissions are coupled via the shift element M. Based on the first clutch K1 the gear stages i_1, i_R, and i_2 are utilized in the reverse gear R2, wherein the two subtransmissions are coupled to each other via the shift element N.

The shift pattern according to FIG. 16 shows in detail that in the first forward gear G1 the gear stage i_1 is utilized. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage i_1, zw_9, and i_8 in the ninth forward gear G9 based on the first clutch K1, wherein the two subtransmissions are coupled via the shift element N. Also, the gear stage i_R is utilized in the reverse gear R1. Based on the second clutch K2 the gear stages i_R, i_3, and i_1 are utilized in the reverse gear R2, wherein the two subtransmissions are coupled via the shift element M. Based on the first clutch K1 the gear stages i_3, i_R, and zw_9 are utilized in the reverse gear R3, wherein the two subtransmissions are coupled to each other via the shift element M. Finally, based on the first clutch K1 the gear stages i_1, zw_9, and i_R are utilized in the reverse gear R4, wherein the two subtransmissions are coupled to each other via the shift element N.

The shift pattern according to FIG. 18 shows in detail that in the first forward gear G1 the gear stage i_1 is utilized. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage zw_9, i_4, and i_8 in the ninth forward gear G9 based on the first clutch K1, wherein the two sub-transmissions are coupled via the shift element M. Also, based on the second clutch K2 the gear stages i_4, zw_9, and i_R are utilized in the reverse gear R1, wherein the two subtransmissions are coupled via the shift element M. Based on the second clutch K2 the gear stages i_2, i_R, and i_1 are utilized in the reverse gear R2, wherein the two subtransmissions are coupled to each other via the shift element N. Finally, based on the second clutch K2 the gear stages i_4, zw_9, and i_1 are utilized in the crawler gear C1, wherein the two subtransmissions are coupled to each other via the shift element M.

The shift pattern according to FIG. 20 shows in detail that in the first forward gear G1 the gear stage i_1 is utilized. Furthermore, the gear stage i_2 is utilized in the second forward gear G2, the gear stage i_3 in the third forward gear G3, the gear stage i_4 in the fourth forward gear G4, the gear stage i_5 in the fifth forward gear G5, the gear stage i_6 in the sixth forward gear G6, the gear stage i_7 in the seventh forward gear G7, the gear stage i_8 in the eighth forward gear G8, and the gear stage zw_9, i_2, and i_8 in the ninth forward gear G9 based on the first clutch K1, wherein the two sub-transmissions are coupled via the shift element N. Also, the gear stage i_R is utilized in the reverse gear R1. Based on the second clutch K2 the gear stages i_4, i_5, and i_R are utilized in the reverse gear R2, wherein the two subtransmissions are coupled via the shift element M. Based on the second clutch K2 the gear stages i_2, zw_9, and i_R are utilized in the reverse gear R3, wherein the two subtransmissions are coupled to each other via the shift element N. Based on the second clutch K2 the gear stages i_4, i_5, and i_1 are utilized in the crawler gear C1, wherein the two subtransmissions are coupled to each other via the shift element M, and based on the second clutch K2 the gear stages i_2, zw_9, and i_1 are utilized in the crawler gear C2, wherein the two subtransmissions are coupled to each other via the shift element N. Finally, based on the first clutch K1 the gear stages i_5, i_4, and i_8 are utilized in the overdrive gear O1, wherein the two subtransmissions are coupled to each other via the shift element M.

In summary, a particularly small construction space is required in the first variant embodiment according to FIGS. 1 and 2 due to component savings, as only one shift element is necessary for carrying out winding path gears. Furthermore, four dual gear planes and one single gear plane are provided in the first variant embodiment, wherein the first forward gear G1 is shifted as the winding path gear via the transmission ratio steps of the third, fourth, and second forward gears. Further, an overdrive gear O1 that may be power shifted to the ninth forward gear, for example, as the $10^{th}$ forward gear, is also possible. This advantageously results in fuel savings.

The first variant embodiment shows in detail that the idler gear 8 is utilized for one forward gear G8 at the first gear plane 8-14 as a dual gear plane, wherein the idler gear 14 is also utilized for one forward gear G6. The idler gear 9 is utilized for three forward gears G1, G4, and O1 at the second gear plane 9-15 as a dual gear plane, wherein the idler gear 15 is utilized for two forward gears G1 and G2. The idler gear 10 is utilized for three forward gears G1, G3, and O1 at the third gear plane 10-16 as a dual gear plane, and the idler gear 16 is utilized for one reverse gear R1. The idler gear 11 is utilized for one forward gear G7 at the fourth gear plane 11-17 as a dual gear plane, and the idler gear 17 is also utilized for one forward gear G5. Finally, the idler gear 18 is utilized for two forward gears G9 and O1 at the fifth gear plane 6-18 as a single gear plane.

In summary the second variant embodiment according to FIGS. 3 and 4 shows that the first forward gear is realized as the winding gear path via the transmission ratios of the fifth, eighth, and second forward gears. Furthermore, only four dual gear planes and one singe gear plane are provided, which comprise two winding path gear shift elements M, N. Further, a crawler gear C1 that can be power shifted to the second forward gear G2 is also possible, whereby the terrain driving properties are improved. Furthermore, additional overdrive gears O1, O3 that can be power shifted to the ninth forward gear G9 results as the $10^{th}$ forward gears leading to fuel savings.

The second variant embodiment shows in detail that the idler gear 7 is utilized for one reverse gear R1 at the first gear plane 7-13 as a dual gear plane, and the idler gear 13 is utilized for three forward gears G1, G2, C1. The idler gear 14 is utilized for one forward gear G4 at the second gear plane 2-14 as a single gear plane. The idler gear 9 is utilized for four forward gears G1, G8, O1, O2 at the third gear plane 9-15 as a dual gear plane, and the idler gear 15 is utilized for five forward gears G6, C1, O3, O4, O5 and for one reverse gear R1. The idler gear 10 is utilized for five forward gears G1, G5, O1, O2, O4 at the fourth gear plane 10-16 as a dual gear plane, and the idler gear 16 is utilized for five forward gears G3, C1, O3, O4, O5 and for one reverse gear R1. Finally, the idler gear 11 is utilized for three forward gears G9, O1, O3 at the fifth gear plane 11-17 as a dual gear plane, and the idler gear 17 is utilized for three forward gears G7, O2, O5.

In summary the third variant embodiment according to FIGS. 5 and 6 shows that the power shifting ninth forward gear G9 is realized as the winding path gear via the transmission ratio steps of the seventh, sixth, and eighth forward gears with only four dual gear planes. Furthermore, only one winding path gear shift element M is required for realizing the winding path gears, which brings about a construction space advantage. Also, the second clutch K2 may be produced at smaller dimensions due to the low load, as the first forward gear O1 and the third forward gear G3, as well as the reverse gear R1 are shifted via the first clutch K1.

The third variant embodiment shows in detail that the idler gear 8 is utilized for one forward gear G2 at the first gear plane 8-14 as a dual gear plane, and the idler gear 14 is utilized for one forward gear G4. The idler gear 9 is utilized for two forward gears G6, G9 and for one reverse gear R1 at the second gear plane 9-15 as a dual gear plane, and the idler gear 15 is utilized for two forward gears G8, G9. The idler gear 10 is utilized for two forward gears G7, G9 and for one reverse gear R1 at the third gear plane 10-4 as a single gear plane. The idler gear 11 is utilized for one forward gear G1 at the fourth gear plane 11-17 as a dual gear plane, and the idler gear 17 is utilized for one forward gear G3. Finally, the idler gear 12 is utilized for one reverse gear R1 at the fifth gear plane 12-18 as a dual gear plane, and the idler gear 18 is utilized for one forward gear G5.

In summary the fourth variant embodiment according to FIGS. 7 and 8 shows that the power shifting ninth forward gear G9 is realized as the winding path gear via the transmission ratio steps of the seventh, sixth, and eighth forward gears with four dual gear planes and one single gear plane. Furthermore, only one winding path gear shift element N is required for realizing the winding path gears, which brings about a construction space advantage. Also, a crawler gear C1 that can be power shifted to the first forward gear G1 may be realized as a possible $10^{th}$ forward gear, thus improving the terrain driving properties. Fuel savings can be realized utilizing an additional overdrive O1 that can be power shifted to the eighth forward gear G8.

The fourth variant embodiment shows in detail that the idler gear 13 is utilized for three forward gears G8, G9, O1 at the first gear plane 1-13 as a single gear plane. The idler gear 8 is utilized for two reverse gears R1, R2, and the idler gear 14 is utilized for one forward gear G2 at the second gear plane 8-14 as a dual gear plane. The idler gear 9 is utilized for two forward gears G4, O1 at the third gear plane as a dual gear plane, and the idler gear 15 is utilized for three forward gears G6, G9, C1 and for one reverse gear R2. The idler gear 10 is utilized for two forward gears G5, O1 at the fourth gear plane 10-16 as a dual gear plane, and the idler gear 16 is utilized for three forward gears G7, G9, C1 and for one reverse gear R2. Finally, the idler gear 11 is utilized for two forward gears G1, C1 at the fifth gear plane 11-17 as a dual gear plane, and the idler gear 17 is utilized for one forward gear G3.

In summary the fifth variant embodiment according to FIGS. 9 and 10 shows that the ninth forward gear G9 that can be power shifted is realized as the winding path gear via the transmission ratio steps of the seventh, sixth, and eighth forward gears with four dual gear planes and one single gear plane. Two winding path gear shift elements M, N are required in order to realize the winding path gears. Furthermore, a crawler gear C1 that can be power shifted to the first forward gear G1 may be realized as a possible $10^{th}$ forward gear and one power shifting reverse gear R1. In this manner a loosening by means of rocking is possible due to the alternation between the first forward gear G1 and the reverse gear R1. Overall, a better transition between the road and terrain use of the vehicle is achieved in this manner.

The fifth variant embodiment shows in detail that the idler gear 8 is utilized for one forward gear G4 at the first gear plane 8-14 as a dual gear plane, and the idler gear 14 is also utilized for a forward gear G2. The idler gear 9 is utilized for two forward gears G8, G9 and one reverse gear R1 at the second gear plane 9-15 as a dual gear plane, and the idler gear 15 is utilized for three forward gears G6, G9, C1. The idler gear 10 is utilized for one reverse gear R1 at the third gear plane 10-16 as a dual gear plane, and the idler gear 16 is utilized for three forward gears G7, G9, C1. The idler gear 11 is utilized for one forward gear G5 at the fourth gear plane 11-17 as a dual gear plane, and the idler gear 17 is utilized for one forward gear G3. Finally, the idler gear 18 is utilized for two forward gears G1, C1 and for one reverse gear R1 at the fifth gear plane 6-18 as a single gear plane.

In summary the sixth variant embodiment according to FIGS. 11 and 12 shows that the ninth forward gear G9 that can be power shifted is realized as the winding path gear via the transmission ratio steps of the seventh, sixth, and eighth forward gears with four dual gear planes and one single gear plane. Furthermore, only one winding path gear shift element N is necessary for realizing the winding path gears, which brings about a construction size advantage. Also, two crawler gears C1, C2 that can be power shifted to the first forward gear G1 may also be realized as possible $10^{th}$ forward gears, thus improving the terrain driving properties.

The sixth variant embodiment shows in detail that the idler gear 7 is utilized for two forward gears G8, G9 at the first gear plane 7-1 as a single gear plane. The idler gear 8 is utilized for two reverse gears R1, R2 at the second gear plane 8-14 as a dual gear plane, and the idler gear 14 is utilized for one forward gear G2. The idler gear 9 is utilized for two forward gears G4, C1 at the third gear plane 9-15 as a dual gear plane, and the idler gear 15 is utilized for three forward gears G6, G9, C2 and for one reverse gear R2. The idler gear 10 is utilized for two forward gears G5, C1 at the fourth gear plane 10-16, as a dual gear plane, and the idler gear 16 is utilized for three forward gears G7, G9, C2 and for one reverse gear R2. Finally, the idler gear 11 is utilized for three forward gears G1, C1, C2 at the fifth gear plane 11-17 as a dual gear plane, and the idler gear 17 is utilized for one forward gear G3.

In summary the seventh, eighth, ninth, and tenth variant embodiments according to FIGS. 13 to 20 show that the ninth forward gear is a power shifting winding path gear, wherein five dual gear planes and one additional intermediate gear stage zw_9 are provided for the winding path gears, which is not utilized in any other forward gear. A winding path gear shift element M or N is also provided.

The seventh variant embodiment according to FIGS. 13 and 14 shows that the ninth power shifting winding path gear can be shifted via the transmission ratio of the third forward gear i_3, the additional intermediate gear stage zw_9, and via the transmission ratio of the eighth forward gear i_8. Furthermore, an approximately balanced clutch load is obtained, as the first and the third forward gears are shifted via the first clutch K1 and the second forward gear and the reverse gear are shifted via the second clutch K2. A similar clutch dimension is the result.

The seventh variant embodiment shows in detail that the idler gear 7 is utilized for two forward gears G8, G9 at the first gear plane 7-13 as dual gear plane, and the idler gear 13 is utilized for one forward gear G6. The idler gear 8 is utilized for one forward gear G4 at the second gear plane 8-14 as a dual gear plane, and the idler gear 14 is utilized for one forward gear G2 and for one reverse gear R2. The idler gear 9 is utilized for one forward gear G9 and for one reverse gear R1 at the third gear plane 9-15 as a dual gear plane, and the idler gear 15 is utilized for two reverse gears R1, R2. The idler gear 10 is utilized for two forward gears G3, G9 and for one reverse gear R1 at the fourth gear plane 10-16 as a dual gear plane, and the idler gear 16 is utilized for one forward gear G1 and for one reverse gear R2. Finally, the idler gear 11 is utilized for one forward gear G7 at the fifth gear plane 11-17 as a dual gear plane, and the idler gear 17 is also used for one forward gear G5.

The eighth variant embodiment according to FIGS. 15 and 16 shows that the ninth power shifting winding path gear can be shifted via the transmission ratio of the first forward gear i_1, the additional intermediate gear stage zw_9, and via the transmission ratio of the eighth forward gear i_8. Furthermore, a reverse gear R1 that can be power shifted to the first forward gear O1 is obtained, thus enabling a loosening by means of rocking of the vehicle.

The eighth variant embodiment shows in detail that the idler gear 7 is utilized for two forward gears G8, G9 at the first gear plane 7-13 as a dual gear plane, and the idler gear 13 is utilized for one forward gear G6. The idler gear 8 is utilized for one forward gear G4 at the second gear plane 8-14 as a dual gear plane, and the idler gear 14 is also utilized for one forward gear G2. The idler gear 9 is utilized for four reverse gears R1, R2, R3, R4 at the third gear plane 9-15 as a dual gear plane, and the idler gear 15 is utilized for one forward gear G9 and for two reverse gears R3, R4. The idler gear 10 is utilized for one forward gear G3 and for two reverse gears R2, R3 at the fourth gear plane 10-16 as a dual gear plane, and the idler gear 16 is utilized for two forward gears G1, G9 and for two reverse gears R2, R4. Finally, the idler gear 11 is utilized for one forward gear G7 at the fifth gear plane 11-17 as a dual gear plane, and the idler gear 17 is also utilized for one forward gear G5.

The ninth variant embodiment according to FIGS. 17 and 18 shows that the ninth power shifting winding path gear can be shifted via the transmission ratio of the additional intermediate gear stage zw_9, the fourth forward gear i_4, and the transmission ratio of the eight forward gear i_8. Furthermore, a crawler gear C1 that can be power shifted to the first forward gear G1 is obtained as a possible $10^{th}$ forward gear, thus enabling an improved transition between a road and terrain use of the vehicle (R2 Isb. to G1).

The ninth variant embodiment shows in detail that the idler gear 8 is utilized for two forward gears G8, G9 at the first gear plane 8-14 as a dual gear plane, and the idler gear 14 is utilized for one forward gear G6. The idler gear 9 is utilized for three forward gears G4, G9, C1, and for one reverse gear R1 at the second gear plane 9-15 as a dual gear plane, and the idler gear 15 is utilized for one forward gear G2 and for one reverse gear R2. The idler gear 10 is utilized for two forward gears G9, C1 and for one reverse gear R1 at the third gear plane 10-16 as a dual gear plane, and the idler gear 16 is utilized for two reverse gears R1, R2. The idler gear 11 is utilized for one forward gear G7 at the fourth gear plane 11-17 as a dual gear plane, and the idler gear 17 is utilized for one forward gear G5. Finally, the idler gear 12 is utilized for one forward gear G3 at the fifth gear plane 12-18 as a dual gear plane, and the idler gear 18 is utilized for two forward gears G1, C1 and for one reverse gear R2.

The tenth variant embodiment according to FIGS. 19 and 20 shows that the ninth power shifting winding path gear can be shifted via the transmission ratio of the additional intermediate gear stage zw_9, the second forward gear i_2, and the transmission ratio of the eighth forward gear i_8. Furthermore, an overdrive gear O1 that can be power shifted to the eighth forward gear G8 is obtained as an alternative ninth forward gear, resulting in fuel savings. Also, two crawler gears that can be power shifted to the first forward gear may be realized as a possible $10^{th}$ forward gear, thus resulting in an improved transition between a road and a terrain use of the vehicle.

The tenth variant embodiment shows in detail that the idler gear 8 is utilized for three forward gears G8, G9, O1 at the first gear plane 8-14 as a dual gear plane, and the idler gear 14 is utilized for one forward gear G6. The idler gear 9 is utilized for three forward gears G4, C1, O1 and for one reverse gear R2 at the second gear plane 9-15 as a dual gear plane, and the idler gear 15 is utilized for three forward gears G2, G9, C2 and for one reverse gear R3. The idler gear 10 is utilized for three forward gears G5, C1, O1 and for one reverse gear R2 at the third gear plane 10-16 as a dual gear plane, and the idler gear 16 is utilized for two forward gears G9, C2 and for one reverse gear R3. The idler gear 11 is utilized for one forward gear G3 at the fourth gear plane 11-17 as a dual gear plane, and the idler gear 17 is utilized for three forward gears G1, C1, C2. Finally, the idler gear 12 is utilized for one forward gear G7 at the fifth gear plane 12-18 as a dual gear plane, and the idler gear 18 is utilized for three reverse gears R1, R2, R3.

In all variant embodiments of the double clutch transmission fewer gear planes, and thus fewer components are necessary at a consistent number of gears due to said multiple uses of individual idler gears provided such that an advantageous construction space and cost savings is brought about.

Regardless of the respective variant embodiment the numeral "1" in a field of the respective table of the shift pattern according to FIGS. 2, 4, 6, 8, 10, 12, 14, 16, 18, and 20 means that the associated clutch K1, K2, or the associated coupling device A, B, C, D, E, F, G, H, I, J, K, L, or the associated shift element M, N is closed. In contrast, a free field in the respective table of the shift pattern according to FIGS. 2, 4, 6, and 8 means that the associated clutch K1, K2, or the associated coupling device A, B, C, D, E, F, G, H, I, J, K, L, or the associated shift element M, N is open. Furthermore, it is possible in many cases to incorporate further coupling or shift elements without having an adverse effect on the flow of power. In this manner a pre-selection of gears may be enabled.

REFERENCE SYMBOLS 1 fixed gear of the second transmission input shaft
2 fixed gear of the second transmission input shaft
3 fixed gear of the second transmission input shaft
4 fixed gear of the first transmission input shaft
5 fixed gear of the first transmission input shaft
6 fixed gear of the first transmission input shaft
7 idler gear of the first countershaft
8 idler gear of the first countershaft
9 idler gear of the first countershaft
10 idler gear of the first countershaft
11 idler gear of the first countershaft
12 idler gear of the first countershaft
13 idler gear of the second countershaft
14 idler gear of the second countershaft
15 idler gear of the second countershaft
16 idler gear of the second countershaft
17 idler gear of the second countershaft
18 idler gear of the second countershaft
19 fixed gear of the output shaft
20 output gear of the first countershaft
21 output gear of the second countershaft
22 torsion vibration damper
K1 first clutch
K2 second clutch
w_an drive shaft
w_ab output shaft
w_v1 first countershaft
w_v2 second counter shaft
w_k1 first transmission input shaft
w_k2 second transmission input shaft
A coupling device
B coupling device
C coupling device
D coupling device
E coupling device
F coupling device
G coupling device
H coupling device
I coupling device
J coupling device
K coupling device
L coupling device
i_1 gear stage first forward gear
i_2 gear stage second forward gear
i_3 gear stage third forward gear
i_4 gear stage fourth forward gear
i_5 gear stage fifth forward gear
i_6 gear stage sixth forward gear
i_7 gear stage seventh forward gear
i_8 gear stage eighth forward gear
i_9 gear stage ninth forward gear
zw_9 intermediate stage gear
G1 first forward gear
G2 second forward gear
G3 third forward gear
G4 fourth forward gear
G5 fifth forward gear
G6 sixth forward gear
G7 seventh forward gear G8 eighth forward gear
G9 ninth forward gear
C1 crawler gear (crawler)
C2 crawler gear
O1 overdrive gear (overdrive)
O2 overdrive gear
O3 overdrive gear
O4 overdrive gear
O5 overdrive gear
R1 reverse gear
R2 reverse gear
R3 reverse gear
R4 reverse gear
w_zw intermediate shaft
ZR intermediate gear
ZS gear stage utilized
M shift element
N shift element
Isb. power shifted

The invention claimed is:

1. A double clutch transmission comprising:
first and second clutches (K1, K2) each comprising an input side connected to a drive shaft (w_an) and an output side connected to a respective one of a first and a second transmission input shaft (w_k1, w_k2) coaxially arranged with respect to one another;
at least first and second countershafts (w_v1, w_v2) supporting toothed idler gearwheels (7, 8, 9, 10, 11, 12, 13, 14, 15, 16, 17, 18);
toothed fixed gearwheels (1, 2, 3, 4, 5, 6) being supported on the first and the second transmission input shafts (w_k1, w_k2) in a rotationally fixed manner, the fixed gearwheels (1, 2, 3, 4, 5, 6) engaging with at least one of the idler gearwheels (7, 8, 9, 10, 11, 12, 13, 14, 15, 16, 17, 18);
a plurality of coupling devices (A, B, C, D, E, F, G, H, I, J, K, L) for connecting an idler gearwheel (7, 8, 9, 10, 11, 12, 13, 14, 15, 16, 17, 18) to one of the first and the second countershafts (w_v1, w_v2) in a rotationally fixed manner;
one output gear (20, 21) being provided on each of the first and the second countershafts (w_v1, w_v2), and each of the output gears (20, 21) being coupled to gearing of an output shaft (w_ab);
a first at least one shift element (M) for connecting two of the toothed idler gearwheels in a rotationally fixed manner so that a plurality of power shifting forward gears (1, 2, 3, 4, 5, 6, 7, 8, 9) and at least one reverse gear (R1, R2, R3, R4) can be shifted;
five gear planes being provided and comprise at least four dual gear planes (7-13, 8-14, 9-15, 10-16, 11-17, 12-18), and for each dual gear plane (7-13, 8-14, 9-15, 10-16, 11-17, 12-18) an idler gearwheel (7, 8, 9, 10, 11, 12, 13, 14, 15, 16, 17, 18) of each of the first and the second countershafts (w_v1, w_v2) is associated with a fixed gearwheel (1, 2, 3, 4, 5, 6) of one of the first and the second transmission input shafts (w_k1, w_k2);
at least one idler gearwheel (8, 9, 10, 11, 14, 15, 16, 17, 18), in each of the dual gear planes (7-13, 8-14, 9-15, 10-16, 11-17, 12-18), is utilized for at least two gears such that a first at least one power shifting winding path gear is shiftable via the first at least one shift element (M or N).

2. The double clutch transmission according to claim 1, wherein the double clutch transmission comprises five dual gear planes (8-14, 9-15, 10-16, 11-17, 12-18).

3. The double clutch transmission according to claim 1, wherein the double clutch transmission comprises the four dual gear planes (7-13, 8-14, 9-15, 10-16, 11-17, 12-18) and one single gear plane (1-13, 7-1, 2-14, 10-4, 6-18).

4. The double clutch transmission according to claim 1, wherein an idler gearwheel (9) of a second sub-transmission is connectable, via the first at least one shift element (M), to an idler gearwheel (10) of a first sub-transmission on the first countershaft (w_v1) such that a first forward gear (G1) is shiftable as the first at least one power shifting winding path gear, and at least one overdrive gear (O1, O2) is shiftable as a second at least one power shifting winding path gear via activation of the first at least one shift element (M).

5. The double clutch transmission according to claim 1, wherein an idler gearwheel (9) of a second sub-transmission is connectable, via the first at least one shift element (M), to an idler gearwheel (10) of a first sub-transmission on the first countershaft (w_v1) such that a ninth forward gear (G9) is shiftable as the first at least one power shifting winding path gear, and at least one reverse gear (R1) is shiftable as a second at least one power shifting winding path gear via activation of the first at least one shift element (M).

6. The double clutch transmission according to claim 1, wherein an idler gearwheel (15) of a second sub-transmission is connectable, via the first at least one shift element (N), to an idler gearwheel (16) of a first sub-transmission on the second countershaft (w_v2) such that at least one of a ninth forward gear (G9), one reverse gear (R2, R3, R4) and a crawler gear (C1, C2) is shiftable as the first at least one power shifting winding path gear via activation of the first at least one shift element (N).

7. The double clutch transmission according to claim 1, wherein a first gear plane (8-14) and a second gear plane (9-15) are dual gear planes and each comprise a fixed gearwheel (2, 3) supported by the second transmission input shaft (w_k2) of a second sub-transmission.

8. The double clutch transmission according to claim 1, wherein a third gear plane (10-16, 10-4) is one of a dual gear plane and a single gear plane, a fourth gear plane (10-16, 10-4, 11-17) is a dual gear plane, and a fifth gear plane (12-18, 6-18) is one of a dual gear plane and a single gear plane, and the third, the fourth and the fifth gear planes (10-16, 10-4, 11-17, 12-18, 6-18) each comprise three fixed gearwheels (4, 5, 6) supported by the first transmission input shaft (w_k1) of a first sub-transmission.

9. The double clutch transmission according to claim 1, wherein a first gear plane (7-13, 1-13; 7-1) is one of a dual gear plane and a single gear plane, a second gear plane (8-14, 2-14) is one of a dual gear plane and a single gear plane, and a third gear plane (9-15) is a dual gear plane, and the first, the second and the third gear planes (7-13, 1-13; 7-1, 8-14, 2-14, 9-15) each comprise three fixed gearwheels (1, 2, 3) supported by the second transmission input shaft (w_k2) of a second sub-transmission.

10. The double clutch transmission according to claim 1, wherein a fourth gear plane (10-16), is a dual gear plane, and a fifth gear plane (11-17), is a dual gear plane and the fourth and the fifth dual gear planes comprise two fixed gears (4, 5) supported by the first transmission input shaft (w_k1) of a first sub-transmission.

11. The double clutch transmission according to claim 1, wherein
a first forward gear (G1) is shiftable as the first at least one power shifting winding path gear via activation of the first clutch (K1), a ninth coupling device (I) and the first at least one shift element (M) located on the first countershaft (w_v1);
a second forward gear (G2) is shiftable via activation of the second clutch (K2) and the ninth coupling device (I);

a third forward gear (G3) is shiftable via activation of the first clutch (K1) and a fourth coupling device (D);
a fourth forward gear (G4) is shiftable via activation of the second clutch (K2) and a third coupling device (C);
a fifth forward gear (G5) is shiftable via activation of the first clutch (K1) and an eleventh coupling device (K);
a sixth forward gear (G6) is shiftable via activation of the second clutch (K2) and an eighth coupling device (H);
a seventh forward gear (G7) is shiftable via activation of the first clutch (K1) and a fifth coupling device (E);
an eighth forward gear (G8) is shiftable via the second clutch (K2) and a second coupling device (B);
a ninth forward gear (G9) is shiftable via the first clutch (K1) and a twelfth coupling device (L); and
a reverse gear (R1) is shiftable via the first clutch (K1) and a tenth coupling device (J).

12. The double clutch transmission according to claim 11, wherein an overdrive gear (O1) is shiftable as a second at least one power shifting winding path gear via activation of the second clutch (K2), the twelfth coupling device (L) and the first at least one shift element (M).

13. The double clutch transmission according to claim 1, wherein
a first forward gear (G1) is shiftable as the first at least one power shifting winding path gear via activation of the first clutch (K1), a seventh coupling device (G) and the first at least one shift element (M) located on the first countershaft (w_v1);
a second forward gear (G2) is shiftable via the second clutch (K2) and the seventh coupling device (G);
a third forward gear (G3) is shiftable via activation of the first clutch (K1) and a tenth coupling device (J);
a fourth forward gear (G4) is shiftable via activation of the second clutch (K2) and an eighth coupling device (H);
a fifth forward gear (G5) is shiftable via activation of the first clutch (K1) and a fourth coupling device (D);
a sixth forward gear (G6) is shiftable via activation of the second clutch (K2) and a ninth coupling device (I);
a seventh forward gear (G7) is shiftable via activation of the first clutch (K1) and an eleventh coupling device (K);
an eighth forward gear (G8) is shiftable via activation of the second clutch (K2) and a third coupling device (C);
a ninth forward gear (G9) is shiftable via activation of the first clutch (K1) and a fifth coupling device (E); and
a reverse gear (R1) is shiftable as a second at least one power shifting winding path gear via activation of the first clutch (K1), a first coupling device (A) and a second at least one shift element (N) located on the second countershaft (w_v2).

14. The double clutch transmission according to claim 13, wherein
a crawler gear (C1) is shiftable as a third at least one power shifting winding path gear via activation of the first clutch (K1), the seventh coupling device (G) and the second at least one shift element (N);
a first overdrive gear (O1) is shiftable as a fourth at least one power 1 shifting winding path gear via activation of the second clutch (K2), the fifth coupling device (E), and the first at least one shift element (M);
a second overdrive gear (O2) is shiftable as a fifth at least one power shifting winding path gear via activation of the second clutch (K2), an eleventh coupling device (K) and the first at least one shift element (M);
a third overdrive gear (O3) is shiftable as a sixth at least one power shifting winding path gear via activation of the second clutch (K2), the fifth coupling device (E) and the second at least one shift element (N);
a fourth overdrive gear (O4) is shiftable as a seventh at least one power shifting winding path gear via activation of the second clutch (K2), the fourth coupling device (D) and the second at least one shift element (N);
a fifth overdrive gear (O5) is shiftable as an eighth at least one power shifting winding path gear via activation of the second clutch (K2), the eleventh coupling device (K) and the second at least one shift element (N).

15. The double clutch transmission according to claim 1, wherein
a first forward gear (G1) is shiftable via activation of the first clutch (K1) and a fifth coupling device (E);
a second forward gear (G2) is shiftable via activation of the second clutch (K2) and a second coupling device (B);
a third forward gear (G3) is shiftable via activation of the first clutch (K1) and an eleventh coupling device (K);
a fourth forward gear (G4) is shiftable via activation of the second clutch (K2) and an eighth coupling device (H);
a fifth forward gear (G5) is shiftable via activation of the first clutch (K1) and a twelfth coupling device (L);
a sixth forward gear (G6) is shiftable via activation of the second clutch (K2) and a third coupling device (C);
a seventh forward gear (G7) is shiftable via activation of the first clutch (K1) and a fourth coupling device (D);
an eighth forward gear (G8) is shiftable via activation of the second clutch (K2) and a ninth coupling device (I);
a ninth forward gear (G9) is shiftable as the first at least one power shifting winding path gear via activation of the first clutch (K1), the ninth coupling device (I) and the first at least one shift element (M) located on the first countershaft (w_v1); and
a reverse gear (R1) is shiftable as a second at least one power shifting winding path gear via activation of the second clutch (K2), a sixth coupling device (F) and the first at least one shift element (M).

16. The double clutch transmission according to claim 1, wherein
a first forward gear (O1) is shiftable via activation of the first clutch (K1) and a fifth coupling device (E);
a second forward gear (G2) is shiftable via activation of the second clutch (K2) and an eighth coupling device (H);
a third forward gear (G3) is shiftable via activation of the first coupling device (K1) and an eleventh coupling device (K);
a fourth forward gear (G4) is shiftable via activation of the second clutch (K2) and a third coupling device (C);
a fifth forward gear (G5) is shiftable via activation of the first clutch (K1) and a fourth coupling device (D);
a sixth forward gear (G6) is shiftable via activation of the second clutch (K2) and a ninth coupling device (I);
a seventh forward gear (G7) is shiftable via activation of the first clutch (K1) and a tenth coupling device (J);
an eighth forward gear (G8) is shiftable via activation of the second clutch (K2) and a seventh coupling device (G);
a ninth forward gear (G9) is shiftable as the first at least one power shifting winding path gear via activation of the first clutch (K1), the seventh coupling device (G) and the first at least one shift element (N) located on the second countershaft (w_v2);
a reverse gear (R1) is shiftable via activation of the second clutch (K2) and a second coupling device (B); and
a second reverse gear (R2) is shiftable as a second at least one power shifting, winding path gear via activation of the first clutch (K1), the second coupling device (B) and the first at least one shift element (N).

17. The double clutch transmission according to claim 16, wherein a crawler gear (C1) is shiftable as a third at least one power shifting winding path gear via activation of the second clutch (K2), the fifth coupling device (E) and the first at least one shift element (N);
an overdrive gear (O1) is shiftable as a fourth at least one power shifting winding path gear via activation of the first clutch (K1), the seventh coupling device (G) and a second at least one shift element (M) located on the first countershaft (w_v1).

18. The double clutch transmission according to claim 1, wherein
a first forward gear (G1) is shiftable via activation of the first clutch (K1) and a twelfth coupling device (L);
a second forward gear (G2) is shiftable via activation of the second clutch (K2) and an eighth coupling device (H);
a third forward gear (G3) is shiftable via activation of the first clutch (K1) and an eleventh coupling device (K);
a fourth forward gear (G4) is shiftable via activation of the second clutch (K2) and a second coupling device (B);
a fifth forward gear (G5) is shiftable via activation of the first clutch (K1) and a fifth coupling device (E);
a sixth forward gear (G6) is shiftable via activation of the second clutch (K2) and a ninth coupling device (I);
a seventh forward gear (G7) is shiftable via activation of the first clutch (K1) and a tenth coupling device (J);
an eighth forward gear (G8) is shiftable via activation of the second clutch (K2) and a third coupling device (C);
a ninth forward gear (G9) is shiftable as the first at least one power shifting winding path gear via activation of the first clutch (K1), the third coupling device (C) and the first at least one shift element (N) located on the second countershaft (w_v2); and
a reverse gear (R1) is shiftable as a second at least one power shifting winding path gear via activation of the second clutch (K2), the twelfth coupling device (L) and a second at least one shift element (M) located on the first countershaft (w_v1).

19. The double clutch transmission according to claim 18, wherein a crawler gear (C1) is shiftable as a third at least one power shifting winding path gear via activation of the second clutch (K2), the twelfth coupling device (L) and the first at least one shift element (N).

20. The double clutch transmission according to claim 1, wherein
a first forward gear (G1) is shiftable via activation of the first clutch (K1) and a fifth coupling device (E);
a second forward gear (G2) is shiftable via activation of the second clutch (K2) and an eighth coupling device (H);
a third forward gear (G3) is shiftable via activation of the first clutch (K1) and an eleventh coupling device (K);
a fourth forward gear (G4) is shiftable via activation of the second clutch (K2) and a third coupling device (C);
a fifth forward gear (G5) is shiftable via activation of the first clutch (K1) and a fourth coupling device (D);
a sixth forward gear (G6) is shiftable via activation of the second clutch (K2) and a ninth coupling device (I);
a seventh forward gear (G7) is shiftable via activation of the first clutch (K1) and a tenth coupling device (J);
an eighth forward gear (G8) is shiftable via activation of the second clutch (K2) and a first coupling device (A);
a ninth forward gear (G9) is shiftable as the first at least one power shifting winding path gear via activation of the first clutch (K1), the first coupling device (A) and the first at least one shift element (N) located on the second countershaft (w_v2);
a first reverse gear (R1) is shiftable via activation of the second clutch (K2) and a second coupling device (B); and
a second reverse gear (R2) is shiftable as a second at least one power shifting winding path gear via activation of the first clutch (K1), the second coupling device (B) and the first at least one shift element (N).

21. The double clutch transmission according to claim 20, wherein
a crawler gear (C1) is shiftable as a third at least one power shifting winding path gear via activation of the second clutch (K2), a fifth coupling device (E) and a second at least one shift element (M) located on the first countershaft (w_v1);
a second crawler gear (C2) is shiftable as a fourth at least one power shifting winding path gear via activation of the second clutch (K2), the fifth coupling device (E) and the first at least one shift element (N).

22. The double clutch transmission according to claim 1, wherein
a first forward gear (O1) is shiftable via activation of the first clutch (K1) and a tenth coupling device (J);
a second forward gear (G2) is shiftable via activation of the second clutch (K2) and an eighth coupling device (H);
a third forward gear (G3) is shiftable via activation of the first clutch (K1) and a fourth coupling device (D);
a fourth forward gear (G4) is shiftable via activation of the second clutch (K2) and a second coupling device (B);
a fifth forward gear (G5) is shiftable via activation of the first clutch (K1) and an eleventh coupling device (K);
a sixth forward gear (G6) is shiftable via activation of the second clutch (K2) and a seventh coupling device (G);
a seventh forward gear (G7) is shiftable via activation of the first clutch (K1) and a fifth coupling device (E);
an eighth forward gear (G8) is shiftable via activation of the second clutch (K2) and a first coupling device (A);
a ninth forward gear (G9) is shiftable as the first at least one power shifting winding path gear via activation of the first clutch (K1), the first coupling device (A) and the first at least one shift element (M) located on the first countershaft (w_v1);
a first reverse gear (R1) is shiftable as a second at least one power shifting winding path gear via activation of the first clutch (K1), a ninth coupling device (I) and the first at least one shift element (M);
a second reverse gear (R2) is shiftable as third at least one power shifting a winding path gear via activation of the first clutch (K1), the eighth coupling device (H) and a second at least one shift element (N) located on the second countershaft (w_v2).

23. The double clutch transmission according to claim 1, wherein
a first forward gear (G1) is shiftable via activation of the first clutch (K1) and a tenth coupling device (J);
a second forward gear (G2) is shiftable via activation of the second clutch (K2) and an eighth coupling device (H);
a third forward gear (G3) is shiftable via activation of the first clutch (K1) and a fourth coupling device (D);
a fourth forward gear (G4) is shiftable via activation of the second clutch (K2) and a second coupling device (B);
a fifth forward gear (G5) is shiftable via activation of the first clutch (K1) and an eleventh coupling device (K);
a sixth forward gear (G6) is shiftable via activation of the second clutch (K2) and a seventh coupling device (G);
a seventh forward gear (G7) is shiftable via activation of the first clutch (K1) and a fifth coupling device (E);

an eighth forward gear (G8) is shiftable via activation of the second clutch (K2) and a first coupling device (A);
a ninth forward gear (G9) is shiftable as the first at least one power shifting winding path gear via activation of the first clutch (K1), the first coupling device (A) and a second at least one shift element (N) located on the second countershaft (w_v);
a first reverse gear (R1) is shiftable via activation of the second clutch (K2) and a third coupling device (C);
a second reverse gear (R2) is shiftable as a second at least one power 4 shifting winding path gear via activation of the second clutch (K2), the tenth coupling device (J) and the first at least one shift element (M) located on the first countershaft (w_v1);
a third reverse gear (R3) is shiftable as a third at least one power shifting winding path gear via activation of the first clutch (K1), a ninth coupling device (I) and the first at least one shift element (M); and
a fourth reverse gear (R4) is shiftable as a fourth at least one power shifting winding path gear via activation of the first clutch (K1), the third coupling device (C) and the second at least one shift element (N).

24. The double clutch transmission according to claim 1, wherein
a first forward gear (G1) is shiftable via activation of the first clutch (K1) and a twelfth coupling device (L);
a second forward gear (G2) is shiftable via activation of the second clutch (K2) and a ninth coupling device (I);
a third forward gear (G3) is shiftable via activation of the first clutch (K1) and a sixth coupling device (F);
a fourth forward gear (G4) is shiftable via activation of the second clutch (K2) and a third coupling device (C);
a fifth forward gear (G5) is shiftable via activation of the first clutch (K1) and an eleventh coupling device (K);
a sixth forward gear (G6) is shiftable via activation of the second clutch (K2) and an eighth coupling device (H);
a seventh forward gear (G7) is shiftable via activation of the first clutch (K1) and a fifth coupling device (E);
an eighth forward gear (G8) is shiftable via activation of the second clutch (K2) and a second coupling device (B);
a ninth forward gear (G9) is shiftable as first at least one power shifting winding path gear via activation of the first clutch (K1), the second coupling device (B) and the first at least one shift element (M) located on the first countershaft (w_v1);
a first reverse gear (R1) is shiftable as a second at least one power shifting winding path gear via activation of the second clutch (K2), a tenth coupling device (J) and the first at least one shift element (M);
a second reverse gear (R2) is shiftable as a third at least one power shifting winding path gear via activation of the second clutch (K2), the twelfth coupling device (L) and a second at least one shift element (N) located on the second countershaft (w_v2); and
a crawler gear (C1) is shiftable as a fourth at least one power shifting winding path gear via activation of the second clutch (K2), the twelfth coupling device (L) and the first at least one shift element (M).

25. The double clutch transmission according to claim 1, wherein
a first forward gear (G1) is shiftable via activation of the first clutch (K1) and an eleventh coupling device (K);
a second forward gear (G2) is shiftable via activation of the second clutch (K2) and a ninth coupling device (I);
a third forward gear (G3) is shiftable via activation of the first clutch (K1) and a fifth coupling device (E);
a fourth forward gear (G4) is shiftable via activation of the second clutch (K2) and a third coupling device (C);
a fifth forward gear (G5) is shiftable via activation of the first clutch (K1) and a fourth coupling device (D);
a sixth forward gear (G6) is shiftable via activation of the second clutch (K2) and an eighth coupling device (H);
a seventh forward gear (G7) is shiftable via activation of the first clutch (K1) and a sixth coupling device (F);
an eighth forward gear (G8) is shiftable via activation of the second clutch (K2) and a second coupling device (B);
a ninth forward gear (G9) is shiftable as the first at least one power shifting winding path gear via activation of the first clutch (K1), the second coupling device (B) and a second at least one shift element (N) located on the second countershaft (w_v2);
a first reverse gear (R1) is shiftable via activation of the first clutch (K1) and a twelfth coupling device (L);
a second reverse gear (R2) is shiftable as a second at least one power shifting winding path gear via activation of the second clutch (K2), the twelfth coupling device (L) and the first at least one shift element (M) located on the first countershaft (w_v1);
a third reverse gear (R3) is shiftable as a third at least one power shifting winding path gear via activation of the second clutch (K2), the twelfth coupling device (L) and the second at least one shift element (N);
a first crawler gear (C1) is shiftable as a fourth at least one power shifting winding path gear via activation of the second clutch (K2), the eleventh coupling device (K) and the first at least one shift element (M);
a second crawler gear (C2) is shiftable as a fifth at least one power shifting winding path gear via activation of the second clutch (K2), the eleventh coupling device (K) and the second at least one shift element (N); and
an overdrive gear (O1) is shiftable as a sixth at least one power shifting winding path gear via activation of the first clutch (K1), the second coupling device (B) and the first at least one shift element (M).

26. The double clutch transmission according to claim 1, wherein an idler gearwheel (15) of a second sub-transmission is connectable, via the first at least one shift element (N), to an idler gearwheel (16) of a first sub-transmission on the second countershaft (w_v2) such that a ninth forward gear (G9) is shiftable as the first at least one power shifting winding path gear via activation of the first at least one shift element (N), one reverse gear (R2, R3, R4) is shiftable as a second at least one power shifting winding path gear via activation of the first at least one shift element (N), and a crawler gear (C1, C2) is shiftable as a third at least one power shifting winding path gear via activation of the first at least one shift element (N).

* * * * *